US012756775B2

(12) United States Patent
Haddad et al.

(10) Patent No.: US 12,756,775 B2
(45) **Date of Patent: *Oct. 6, 2026**

(54) SPEAKERPHONE WITH ROOM ACOUSTICS CHARACTERIZATION AND RELATED METHODS

(71) Applicant: GN Audio A/S, Ballerup (DK)

(72) Inventors: Karim Haddad, Naerum (DK); Clément Laroche, Frederiksberg (DK); Rasmus Kongsgaard Olsson, Roskilde (DK)

( * ) Notice: Subject to any disclaimer, the term of this patent is extended or adjusted under 35 U.S.C. 154(b) by 438 days.

This patent is subject to a terminal disclaimer.

(21) Appl. No.: 18/232,841

(22) Filed: Aug. 11, 2023

(65) Prior Publication Data

US 2024/0064229 A1 Feb. 22, 2024

(30) Foreign Application Priority Data

Aug. 19, 2022 (EP) .................................... 22191293

(51) Int. Cl.
*H04M 3/00* (2024.01)
*H04M 1/02* (2006.01)
(Continued)

(52) U.S. Cl.
CPC ........... *H04M 3/002* (2013.01); *H04M 1/026* (2013.01); *H04M 1/6033* (2013.01);
(Continued)

(58) Field of Classification Search
CPC .... H04M 3/002; H04M 1/72454; H04M 9/08; H04M 1/6033; H04M 1/026;
(Continued)

(56) References Cited

U.S. PATENT DOCUMENTS 6,987,992 B2 * 1/2006 Hundal ................. H04R 3/005 455/73
7,110,951 B1 * 9/2006 Lemelson ................ H04R 5/04 704/270
(Continued)

FOREIGN PATENT DOCUMENTS

CN 114067776 2/2022
JP 2012242597 12/2012

*Primary Examiner* — Lisa Hashem

(57) ABSTRACT

A speakerphone is disclosed. The speakerphone comprises an interface, a speaker, one or more microphones including a first microphone, a processor, and a memory. The speakerphone is configured to obtain an internal output signal for provision of an internal audio output signal in an environment. The speakerphone is configured to output the internal audio output signal in the environment. The speakerphone is configured to obtain a microphone input signal. The speakerphone is configured to determine an impulse response associated with the environment. The speakerphone is configured to determine one or more environment parameters indicative of acoustics of the environment. The speakerphone is configured to determine an environment score indicative of suitability of a conference setup in the environment. The speakerphone is configured to output the environment score.

18 Claims, 13 Drawing Sheets

(51) Int. Cl.

| | |
|---|---|
| *H04M 1/60* | (2006.01) |
| *H04M 1/72454* | (2021.01) |
| *H04M 9/08* | (2006.01) |
| *H04R 1/02* | (2006.01) |
| *H04R 1/08* | (2006.01) |
| *H04R 27/00* | (2006.01) |

(52) U.S. Cl.
CPC .......... *H04M 1/72454* (2021.01); *H04M 9/08* (2013.01); *H04R 1/02* (2013.01); *H04R 1/08* (2013.01); *H04R 27/00* (2013.01); *H04R 2227/001* (2013.01); *H04R 2227/007* (2013.01); *H04R 2227/009* (2013.01); *H04R 2499/11* (2013.01)

(58) Field of Classification Search
CPC ........ H04R 2227/001; H04R 2227/007; H04R 2227/009; H04R 27/00; H04R 1/02; H04R 1/08; H04R 2499/11
See application file for complete search history.

(56) References Cited

U.S. PATENT DOCUMENTS

| | | | | |
|---|---|---|---|---|
| 8,417,522 | B2 * | 4/2013 | Xu | G10L 15/20 704/233 |
| 12,354,607 | B2 * | 7/2025 | Malik | G10L 25/51 |
| 12,413,904 | B2 * | 9/2025 | Nighman | H04R 1/406 |
| 12,490,042 | B2 * | 12/2025 | Davis | H04R 3/04 |
| 12,574,627 | B2 * | 3/2026 | Huang | G06F 9/453 |
| 2009/0076813 | A1 * | 3/2009 | Jung | G10L 15/20 704/E15.001 |
| 2015/0371638 | A1 * | 12/2015 | Ma | G10L 15/02 704/275 |
| 2022/0021971 | A1 * | 1/2022 | Hansen | H04R 1/02 |
| 2022/0263933 | A1 | 8/2022 | Kurihara | |
| 2024/0064241 | A1 * | 2/2024 | Haddad | G10L 25/84 |
| 2024/0073608 | A1 * | 2/2024 | Haddad | H04R 3/005 |
| 2025/0080656 | A1 * | 3/2025 | Mróz | H04M 3/568 |
| 2025/0356832 | A1 * | 11/2025 | Schreibman | H04M 9/08 |

* cited by examiner

SPEAKERPHONE WITH ROOM ACOUSTICS CHARACTERIZATION AND RELATED METHODS

RELATED APPLICATIONS

This application claims priority to European Patent Application No. EP22191293.4 filed on Aug. 19, 2022, the entire contents of which are incorporated herein by reference.

FIELD

The present disclosure pertains to the field of server devices and speakerphones, and in particular to server devices and speakerphones for environment acoustics determination and related methods.

The present disclosure pertains to the field of speakerphones, and in particular to speakerphones with environment acoustics characterization and related methods.

BACKGROUND

In general a speakerphone deals with two types of signals: the signal that comes from the other end (far-end) and excites a speaker of the speakerphone, and the signal transmitted by a microphone(s) of the speakerphone from the environment (such as a room) where the speakerphone is located (near-end). The microphone(s) picks up the target sound (such as speech) in the near-end, but also the echo from the loudspeaker and the background noise in the environment. These two last contributions, the echo and the background noise, degrade the quality of the communication as perceived from the far-end.

Signal processing pipeline is put in place to mitigate these contributions. For example, an echo canceller may be an element of this pipeline. Further, these signal processing blocks may be tuned based on assumptions concerning the acoustics of the environment at the near-end. However, these assumptions remain challenging to make.

SUMMARY

There is currently a lack of accurate and convenient technologies for characterizing acoustics of an environment of a speakerphone.

Accordingly, there is a need for speakerphones with environment acoustics characterization and methods with environment acoustics characterization, which may mitigate, alleviate, or address the shortcomings existing and may provide improved acoustics characterization of an environment.

A speakerphone is disclosed. The speakerphone may be seen as a speakerphone with environment acoustics characterization and/or monitoring. The speakerphone comprises an interface, a speaker, one or more microphones including a first microphone, a processor, and a memory. The speakerphone is configured to obtain, such as using the processor, an internal output signal for provision of an internal audio output signal in an environment. The speakerphone is configured to output, such as using the speaker and based on the internal output signal, the internal audio output signal in the environment. The speakerphone is configured to obtain, such as using the first microphone, a microphone input signal. The speakerphone is configured to determine, such as using the processor and based on the internal output signal and the microphone input signal, an impulse response associated with the environment. The speakerphone is configured to determine, such as using the processor and based on the impulse response, one or more environment parameters, e.g., indicative of acoustics of the environment, the one or more environment parameters including a first environment parameter. Optionally, the speakerphone is configured to determine, based on the first environment parameter, an environment score, e.g., indicative of suitability of a conference setup in the environment. Optionally, the speakerphone is configured to output, e.g., via the interface and/or the speaker, the environment score.

Further, a system is disclosed. The system comprises a speakerphone as disclosed herein, and an electronic device as disclosed herein.

A method of operating a speakerphone system is disclosed. The speakerphone system comprises one or more speakerphones including a first speakerphone, and an electronic device. The method comprises obtaining, such as using the first speakerphone, an internal output signal for provision of an internal audio output signal in an environment. The method comprises outputting, such as using the first speakerphone and based on the internal output signal, an internal audio output signal in the environment. The method comprises obtaining, such as using the first speakerphone, a microphone input signal. The method comprises determining, such as using the first speakerphone and based on the internal output signal and the microphone input signal, an impulse response associated with the environment. The method comprises determining, such as using the first speakerphone and based on the impulse response, one or more environment parameters, e.g., indicative of acoustics of the environment, the one or more environment parameters including a first environment parameter. The method comprises determining, based on the first environment parameter, an environment score, e.g., indicative of suitability of a conference setup in the environment. Optionally, the method comprises outputting, such as using the first speakerphone, the environment score.

The disclosed speakerphone system, speakerphone, and related methods provide improved environment acoustics characterization. In other words, the present disclosure may provide improved audio-based environment acoustics characterization, e.g., with improved environment parameter assumption(s). In other words, the present disclosure may provide improved accuracy and precision in determining environment parameter(s) and/or environment score(s). By extracting information on the acoustics of an environment (such as a room), the present disclosure may provide improved environment acoustics characterization. For example, a size of an environment, a duration of echo, and/or a level of background noise may have an influence on an audio quality of a rendered speech at a far-end. The present disclosure may provide an improved feedback on environment acoustics and acoustic characteristics of an environment, such as an environment where a speakerphone is located. In other words, the present disclosure may provide knowledge of an environment where a speakerphone is located. Furthermore, the present disclosure may enable to monitor the acoustics of an environment, such as noise levels of one or more meeting rooms. This may for example help an IT service in improving and maintaining the acoustic characteristics of an environment, e.g., in order to improve an audio quality when having a meeting. For example, this may help an IT service to correct and/or adjust an existing speakerphone setup (such as adding one or more speakerphones and/or change one or more positions of the speakerphone(s)).

It may be appreciated that the present disclosure may provide improved signal processing, such as improved tuning of a signal processing pipeline. The signal processing may be improved based on the environment parameter(s) and/or environment score(s). In turn, the present disclosure may provide improved output signal(s), such as improved audio output quality at the far-end, such as for a far-end user. In other words, the present disclosure may provide an improved audio quality of speech at the far-end, e.g., during a call or a meeting.

An advantage of the present disclosure is that it is possible to improve the design of speakerphones to improve an audio quality of an output signal, such as speech quality at a far-end of a transmitted audio signal, and/or the design and/or configuration of environments in order to improve the acoustics of the environment for in turn improving the audio quality of an output signal(s).

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
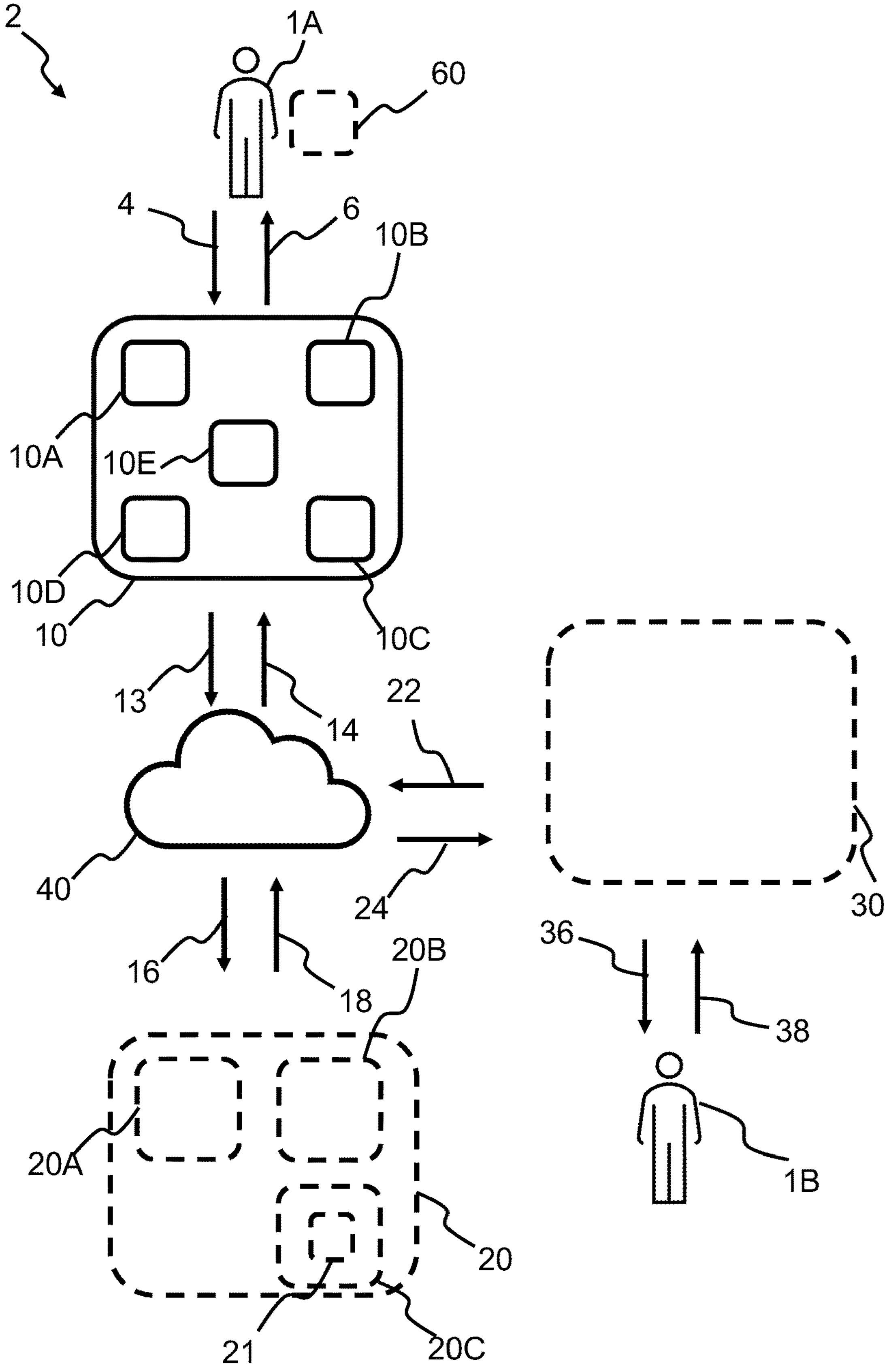
FIG. 1 schematically illustrates an example system according to the present disclosure, FIG. 2 schematically illustrates an example speakerphone according to the present disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

A system is disclosed. The system may be seen as a speakerphone system. The system may be seen as a speakerphone system for performing calls, such as audio and/or video calls. The system, such as speakerphone system, may be seen as a system with environment acoustics characterization.

The system comprises a speakerphone as disclosed herein, and an electronic device as disclosed herein. The system may comprise one or more speakerphones, such as a plurality of speakerphones. The system may comprise a first speakerphone, a second speakerphone, a third speakerphone, and/or a fourth speakerphone.

In one or more example systems and/or speakerphones, the electronic device is an accessory device.

The electronic device and/or accessory device may for example be or comprise a mobile phone, such as a smartphone, a smart-watch, a conference hub, a smart-tv, smart-speakers, a tablet, a computer, such as a laptop computer or PC, or a tablet computer. In other words, the electronic device may for example be a user device, such as a mobile phone or a computer, configured to communicate with the speakerphone. In one or more example systems and/or speakerphones, the electronic device may be seen as a user accessory device, such as a mobile phone, a smart watch, a tablet, and/or a wearable gadget. In one or more example systems, the electronic device may comprise one or more transceivers for wireless communication. In one or more example systems, the accessory device may facilitate wired communication, such as by using a cable, such as an electrical cable.

A system is disclosed. The system comprises one or more speakerphones as disclosed herein and a server device as disclosed herein.

A speakerphone is disclosed. The speakerphone as disclosed herein may comprise an interface, a speaker, one or more microphones including a first microphone, one or more processors, and a memory.

In one or more example speakerphones, the speakerphone may comprise one or more interfaces, one or more processors, and one or more memories. Further, the speakerphone may comprise one or more microphones, such as a first microphone, optionally a second microphone, optionally a third microphone and optionally a fourth microphone. The speakerphone may comprise one or more speakers, such as audio speakers, e.g., loudspeaker(s).

The speakerphone may be seen as an audio device configured to obtain audio signals, output audio signals, and process audio signals. The speakerphone may be seen as a conference speakerphone, e.g., configured to be used by a party (such as one or more users at a near-end) to communicate with one or more other parties (such as one or more users at a far-end). The speakerphone may be seen as a smart speakerphone. The speakerphone may be used for a conference and/or a meeting between two or more parties being remote from each other. The speakerphone may be used by one or more users in a vicinity of where the speakerphone is located, also referred to as a near-end.

The speakerphone may be a single speakerphone. The speakerphone may be seen as a plurality of interconnected speakerphones, such as a system, such as a speakerphone system. The system may comprise one or more users. It is noted that the term speaker may be seen as the user of the speakerphone. The speakerphone may be configured to process one or more audio signals. The speakerphone can be configured to output audio signals. The speakerphone may be configured to obtain, such as to receive via the interface and/or the microphone(s), the audio signals.

In one or more example speakerphones, the interface comprises a wireless transceiver, also denoted as a radio transceiver, and an antenna for wireless transmission and reception of an audio signal, such as for wireless transmission of the output signal and/or wireless reception of a wireless input signal. The speakerphone may be configured for wireless communication with one or more electronic devices, such as another speakerphone, a smartphone, a tablet, a computer and/or a smart watch. The speakerphone optionally comprises an antenna for converting one or more wireless input audio signals to antenna output signal(s). The speakerphone system, the speakerphone, and/or the electronic device may be configured for wireless communications via a wireless communication system, such as short-range wireless communications systems, such as Wi-Fi, Bluetooth, Zigbee, IEEE 802.11, IEEE 802.15, infrared and/or the like.

The speakerphone system, the speakerphone, and/or the electronic device may be configured for wireless communications via a wireless communication system, such as a 3GPP system, such as a 3GPP system supporting one or more of: New Radio, NR, Narrow-band IoT, NB-IoT, and Long Term Evolution—enhanced Machine Type Communication, LTE-M, millimeter-wave communications, such as millimeter-wave communications in licensed bands, such as device-to-device millimeter-wave communications in licensed bands.

In one or more example speakerphone systems, speakerphones, and/or electronic devices, the interface of the electronic device and/or the interface of the speakerphone comprises one or more of: a Bluetooth interface, Bluetooth low energy interface, and a magnetic induction interface. For example, the interface of the electronic device and/or the interface of the speakerphone may comprise a Bluetooth antenna and/or a magnetic interference antenna.

In one or more example speakerphones, the interface may comprise a connector for wired communication, via a connector, such as by using an electrical cable. The connector may connect one or more microphones to the speakerphone. The connector may connect the speakerphone to an electronic device, e.g., for wired connection.

The one or more interfaces can be or comprise wireless interfaces, such as transmitters and/or receivers, and/or wired interfaces, such as connectors for physical coupling. For example, the speakerphone may have an input interface configured to receive data, such as a microphone input signal. In one or more example speakerphones, the speakerphone can be used for all form factors in all types of environments, such as for headsets and/or video conference equipment. For example, the speakerphone may not have a specific microphone placement requirement. In one or more example speakerphones, the speakerphone may comprise an external microphone.

A speakerphone, the speakerphone comprising an interface, a speaker, and one or more microphones including a first microphone, the speakerphone comprising a processor and a memory, wherein the speakerphone is configured to: obtain, using the processor, an internal output signal for provision of an internal audio output signal in an environment; output, using the speaker and based on the internal output signal, the internal audio output signal in the environment; obtain, using the first microphone, a microphone input signal; determine, using the processor and based on the internal output signal and the microphone input signal, an impulse response associated with the environment; determine, using the processor and based on the impulse response, one or more environment parameters indicative of acoustics of the environment, the one or more environment parameters including a first environment parameter; determine, based on the first environment parameter, an environment score indicative of suitability of a conference setup in the environment; and output the environment score.

A speakerphone, the speakerphone comprising an interface, a speaker, and one or more microphones including a first microphone, the speakerphone comprising a processor and a memory, wherein the speakerphone is configured to: obtain, using the processor, an internal output signal for provision of an internal audio output signal in an environment; output, using the speaker and based on the internal output signal, the internal audio output signal in the environment; obtain, using the first microphone, a microphone input signal; determine, using the processor and based on the internal output signal and the microphone input signal, an impulse response associated with the environment; determine, using the processor and based on the impulse response, one or more environment parameters indicative of acoustics of the environment, the one or more environment parameters including a first environment parameter; transmit, via the interface, the impulse response and/or the first environment parameter to a server device.

The speakerphone is configured to obtain, such as using the processor and via the interface, an internal output signal for provision of an internal audio output signal in an environment. In one or more example speakerphones, the speakerphone is configured to obtain the internal output signal from a far-end, such as a far-end party or user(s). In one or more example speakerphones, the speakerphone is configured to obtain the internal output signal from the memory and/or from a server device. The internal output signal may be indicative of an audio signal generated by user(s) at the far-end. In other words, the internal output signal may be indicative of speech from the far-end. In one or more example speakerphones, the internal output signal is based on a test signal obtained from the memory and/or the server device.

An environment may be seen as an environment of the speakerphone, such as the surroundings of the speakerphone. For example, an environment may comprise a room where the speakerphone is located, such as a conference room, a meeting room, a boardroom, a meeting hall, and an auditorium. In one or more example speakerphones, the environment may comprise an interior of a building, such as inside environment, and/or an exterior of a building, such as an outside environment. In other words, the speakerphone may be located in an environment being inside a building, outside a building, and/or in a mixed environment comprising both inside parts and outside parts. An environment may include different elements, such as be composed of different elements. An environment may include building elements, such as walls, windows, and/or doors, objects, such as tables, chairs, lamps, and/or carpets, and/or persons, such as human beings located in the environment. The environment may have a certain acoustic setting, such as have certain acoustic characteristics, based on the elements present in the environment.

The speakerphone is configured to output, such as using the speaker and based on the internal output signal, the internal audio output signal in the environment. In other words, the speakerphone may be configured to output, via the speaker and based on the internal output signal, the internal audio output signal in the environment. The internal audio output signal may be seen as an output of the speaker at a near-end where the speakerphone and the user(s) of the speakerphone are located.

The speakerphone is configured to obtain, using the first microphone, a microphone input signal. The microphone input signal may be associated with the internal audio output signal. In other words, the microphone input signal may comprise audio data associated with the internal audio output signal. For example, the microphone input signal may be seen as a first microphone input signal obtained at a first time. The first microphone input signal may be seen as a microphone input signal obtained at a first time and being associated with the internal audio output signal. In one or more example speakerphones, the speakerphone is configured to obtain, such as using the processor and via the interface, a microphone input signal from one or more microphones, such as a first microphone, a second microphone, a third microphone and/or a fourth microphone. In one or more example speakerphones, the microphone input signal may be a combined input signal obtained from two or more of the first microphone, the second microphone, the third microphone, and the fourth microphone. The microphone input signal may be seen as the resulting signal(s) after the internal audio output signal was outputted by the speaker in the environment. In other words, the microphone input signal may be seen as a reaction of the environment to the internal audio output signal that was outputted. In other words, the microphone input signal may be collected as a result of the internal audio output signal outputted in the environment, such as an internal audio output signal based on a far-end input signal and/or a test signal. The microphone input signal may be representative of a direct path of an internal audio output signal from the speaker to a microphone, such as the first microphone, and/or a reverberation of an internal audio output signal from the speaker, such as a reverberation in the environment of an internal audio output signal outputted from the speaker.

In one or more example speakerphones, the microphone input signal may be indicative of an audio signal generated by user(s) of the speakerphone in the environment. In one or more example speakerphones, the microphone input signal may be indicative of an audio signal generated by the user(s) of the speakerphone while using the speakerphone. In other words, the microphone input signal may be indicative of user speech. In one or more example speakerphones, the microphone input signal may comprise one or more of the user's speech, such as a user speech in a near-field, interfering speech, such as a jamming speech from one or more speakers in the far-field, noise, such as ambient noise, continuous noise, intermittent noise, impulsive noise, and/or low-frequency noise, and/or echo of one or more of the user's speech, interfering speech, and noise.

In one or more example speakerphones, the speakerphone may be configured to obtain the microphone input signal from a distant microphone which is connected wirelessly with the speakerphone. In one or more example speakerphones, the speakerphone may be configured to obtain the microphone input signal from a distant microphone which is connected to the speakerphone via a cable, such as an audio cable and/or an electrical cable. In one or more example speakerphones, the user of the speakerphone may present within 10 meters range from the speakerphone while using the speakerphone. In an example scenario, a user may be using a speakerphone, such as a smart speaker for communication, positioned 10 meters apart. The speakerphone may be configured to obtain the user's speech, such as user commands, such as the user voice commands.

The speakerphone is configured to determine, using the processor and based on the internal output signal and the microphone input signal, an impulse response associated with the environment. In one or more speakerphones, the speakerphone is configured to determine the impulse response based on the first microphone input signal. The impulse response may be seen as an acoustic impulse response. It may be appreciated that the impulse response may be denoted room impulse response. The impulse response may be seen as an impulse response between the speaker, e.g., being an excitation source, of the speakerphone and the microphone(s) of the speakerphone, such as the first microphone. The impulse response may be influenced by the speakerphone itself and the environment, such as room, where the speakerphone is located. It may be appreciated that the impulse response reflects one or more acoustic paths from the speaker to the microphone(s), such as first microphone. In one or more example speakerphones, the speakerphone is configured to adjust and/or compensate for the microphone(s) and/or the speaker. In other words, the speakerphone is configured to compensate for one or more transfer functions of the microphone(s) and/or the speaker. For example, the speakerphone is configured to compensate for one or more acoustic paths from the speakerphone, such as from the speaker of the speakerphone, to the microphone(s) of the speakerphone.

The speakerphone is configured to determine, such as using the processor and based on the impulse response, one or more environment parameters indicative of acoustics of the environment. In one or more example speakerphones, the one or more environment parameters include a first environment parameter. In other words, the speakerphone may be configured to determine, such as using the processor and based on the impulse response, a first environment parameter. The one or more environment parameters may comprise a second environment parameter, a third environment parameter, a fourth environment parameter, and/or a fifth environment parameter. An environment parameter may be seen as indicative of an acoustic parameter of the environment. In other words, an environment parameter may be indicative of an acoustic characteristic of the environment. An environment parameter may also be denoted a room acoustics parameter. For example, the first environment parameter may be indicative of a first acoustic parameter of the environment, the second environment parameter may be indicative of a second acoustic parameter of the environment, the third environment parameter may be indicative of a third acoustic parameter of the environment, the fourth environment parameter may be indicative of a fourth acoustic parameter of the environment, and/or the fifth environment parameter may be indicative of a fifth acoustic parameter of the environment.

The speakerphone is configured to determine, such as using the processor and based on the first environment parameter, an environment score indicative of a suitability of a conference setup in the environment. The environment score may be seen as an evaluation of suitability of a conference setup in the environment where the speakerphone is located. In other words, the environment score may be seen as a level of suitability of a conference setup in the environment. For example, the environment score may be indicative of a level of an audio quality, such as an audio quality rendered at the far-end, when using the speakerphone with the current conference setup in the environment. In other words, the environment score may give an indication of a level of audio quality, such as speech quality, that can be rendered at the far-end when using the speakerphone with the current conference setup in the environment. For example, the environment score may give an indication of a level of audio quality, such as speech quality, that can be provided for an external output signal, e.g., to be transmitted to the far-end. It may be appreciated, that the environment score may provide an estimation of an appropriateness of an environment, such as an appropriateness of a room, for a conversation, a meeting, and/or a conference with a current conference setup. The environment score may be indicative of an acoustic performance and/or characteristics of the conference setup in the environment. The environment score may indicate whether the conference setup in the environment is suitable for having a meeting and/or a conference with satisfying audio speech quality from the near-end where the speakerphone is located or not.

A conference setup may be seen as a physical setup of the environment where the speakerphone is located. In other words, the conference setup may be indicative of a setup of different elements in the environment. For example, a conference setup may be indicative of a setup of building elements located in the environment of the speakerphone, such as a number of walls, a material of a wall surface, a material of a ceiling surface, a material of a floor surface, a number of doors, a material of a door, and/or a number of windows. For example, a conference setup may be indicative of a setup of objects located in the environment of the speakerphone, such as a number, a material, and/or a position of chairs, a number, a material, and/or a position of tables, a number, a material, and/or a position of lamps, and/or a number, a material, and/or a position of carpets. For example, a conference setup may be indicative of a setup of persons (such as users) located in the environment of the speakerphone, such as a number and/or a position of persons in the environment. A conference setup may be indicative of a speakerphone setup. A speakerphone setup may comprise a number of speakerphones, a number of speakers of a speakerphone, a number of microphones of a speakerphone, a position of a speakerphone in the environment, and/or an orientation of a speakerphone in the environment (such as an orientation in view of the elements in the environment). The conference setup may be associated with one or more acoustic characteristics. For example, the acoustic characteristics of the conference setup may vary depending on the conference setup in the environment. In other words, the acoustic characteristics of the conference setup may vary depending on an arrangement of one or more elements present in the environment.

In one or more example speakerphones, the speakerphone is configured to transmit, via the interface, the impulse response and/or the first environment parameter to a server device.

It is an advantage that the speakerphone transmits an impulse response and/or environment parameters to the server device. In other words, this may avoid privacy and/or confidentiality issues at the server device by only transmitting impulse responses and/or environment parameters. An impulse response and/or an environment parameter may not contain any private or confidential data and is therefore safe to transmit to a server device, without having concerns about sharing private or confidential information.

In one or more example speakerphones, the speakerphone is configured to transmit, via the interface, the environment score to the server device.

In one or more example speakerphones, the speakerphone is configured to output the environment score. In one or more example speakerphones, the speakerphone is configured to output, such as via the speaker and/or the interface and using the processor, the environment score. In one or more example speakerphones, the speakerphone is configured to output the environment score to the memory, such as to store the environment score in a part of the memory. In one or more example speakerphones, the speakerphone is configured to output, via the interface, the environment score to a server device, e.g., via an electronic device as disclosed herein and/or via a global network such as the internet and/or a local network. For example, the speakerphone may be configured to output the environment score to an IT department in charge of the conference setup in the environment. By providing the environment score, an improved feedback on environment acoustics and acoustic characteristics of an environment, such as an environment where a speakerphone is located is achieved. In other words, the present disclosure may provide knowledge of an environment where a speakerphone is located. Furthermore, the environment score may enable to monitor the acoustics of an environment, such as noise levels of one or more meeting rooms. This may for example help an IT service in improving and maintaining the acoustic characteristics of an environment, e.g., in order to improve an audio quality when having a meeting. In one or more example speakerphones, to output the environment score comprises to output, e.g., to the user and via the speaker of the speakerphone, an audio signal representing the environment score.

In one or more example speakerphones, to output the environment score comprises to display, e.g., via the interface of the electronic device as disclosed herein, a user interface representing the environment score. In one or more example speakerphones, the speakerphone may comprise a display, and to output the environment score comprises to display, e.g., via the display of the speakerphone, a user interface representing the environment score.

Outputting the environment score may comprise displaying a user interface indicative of the environment score. In one or more example speakerphones, outputting the environment score may comprise outputting, via the interface of the electronic device, a first environment score associated with a first conference setup of the environment, a second environment score associated with a second conference setup of the environment, a third environment score associated with a third conference setup of the environment, etc.

A user interface may comprise one or more, such as a plurality of, user interface objects. For example, the user interface may comprise one or more user interface objects, such as a first user interface object and/or a second user interface object. A user interface object may refer herein to a graphical representation of an object that is displayed on an interface of the electronic device, such as a display. The user interface object may be user-interactive, or selectable by a user input. For example, an image (e.g., icon), a button, and text (e.g., hyperlink) each optionally constituting a user interface object. The user interface object may form part of a widget. A widget may be seen as a mini-application that may be used by the user. To output the environment score may comprise to output an environment score comprising one or more of text (such as a text string) and/or a phrase, a score (such as an evaluation score and/or an acoustic score), image data (such as one or more images), a sound, an audio message, and/or a user interface object comprising one or more of the previous. For example, to output the environment score may comprise to output an environment score comprising a report of the suitability of the conference setup in the environment and/or a report of the acoustic characteristics of the environment. For example, to output the environment score may comprise to output a conference setup representation comprising the environment score, such as an evaluation score of the suitability of the conference setup in the environment.

In one or more example speakerphones, the processor comprises machine learning circuitry configured to operate according to a machine learning model. In one or more example speakerphones, to determine the one or more environment parameters comprises to determine the one or more environment parameters, based on the impulse response, using the machine learning model and/or machine learning circuitry.

In other words, the speakerphone may comprise one or more processors comprising a machine learning engine configured to operate according to the machine learning model. The machine learning circuitry may be seen as a predictor circuitry configured to operate according to a prediction model. The machine learning circuitry may be configured to predict, based on the impulse response, one or more environment parameters using the prediction model. In one or more speakerphones, the machine learning circuitry may be configured to predict, based on the reverberation time, the direct-to-reverberant ratio, and the early decay time, one or more environment parameters using the prediction model.

The machine learning model may for example comprise or make use of a neural network, artificial intelligence, deep learning, and/or machine learning. The machine learning model may be seen as a model for environment acoustics characterization.

In one or more example speakerphones and/or speakerphone systems, the machine learning model comprises model layers including an input layer, one or more intermediate layers, and an output layer for provision of the one or more environment parameters, such as the first environment parameter. In one or more example speakerphones and/or speakerphone systems, the machine learning model comprises a neural network. In one or more example speakerphones and/or speakerphone systems, the machine learning model comprises neural network layers including an input layer, one or more intermediate layers, and an output layer for provision of one or more environment parameters, such as the first environment parameter. In other words, the input layer, the one or more intermediate layers, and/or the output layer may be seen as layers of a machine learning model such as layers of a neural network. The one or more intermediate layers may be considered as hidden layers (such as hidden features). The one or more intermediate layers may include a first intermediate layer.

A model as referred to herein (such as the machine learning model) may be seen as a model and/or a scheme and/or a mechanism and/or a method configured to provide, based on operational data (such as one or more impulse responses) and/or a previous model, one or more previous environment parameters. A model as referred to herein (such as the machine learning model) may be based on the same model architecture. A model architecture may be based on a neural network, such as comprising one or more different type of layers and/or number of layers. A model architecture may be seen as configuration of a model, such as comprising one or more parameters of a model.

In one or more example speakerphones and/or speakerphone systems, the model as referred to herein may be stored on a non-transitory storage medium (for example, on the memory of the speakerphone). The model may be stored on a non-transitory storage medium of the speakerphone being configured to execute the model. In one or more example speakerphones and/or speakerphone systems, the model may comprise model data and or computer readable instructions (for example based on the impulse response, internal output signal, and/or microphone input signal, such as historical impulse response data). The model data and/or the computer readable instructions may be used by the speakerphone. The model (such as model data and/or the computer readable instructions) may be used by the speakerphone to determine environment parameters and/or environment scores. In other words, the model (such as model data and/or the computer readable instructions) may be used by the speakerphone to determine one or more environment parameters, parameters as described herein, such as a first parameter, a second parameter, and/or a third parameter. In one or more example speakerphones, the machine learning model may be used to determine one or more parameters as described herein, such as the first parameter being a reverberation time, the second parameter being a direct-to-reverberant ratio, and/or the third parameter being an early decay time. In one or more example speakerphones, the machine learning model may be used to determine, based on the impulse response, one or more parameters as described herein, such as a size of the environment, a volume of the environment, a geometry of the environment, a level of absorption of the environment, and/or a position of the speakerphone in the environment.

In one or more example speakerphones, the machine learning circuitry comprises a neural network module configured to operate according to a neural network.

The machine learning model may be based on a neural network (such as a convolutional neural network, a deep learning neural network, a recurrent neural network, and/or a combined learning circuitry). The machine learning circuitry may be configured to determine (and optionally identify) one or more patterns in existing data (impulse response data, internal output signal data, microphone input signal data, and/or environment parameters) in order to facilitate making determinations and/or predictions for subsequent environment parameters. For example, the machine learning circuitry may be configured to determine (such as recognize) an environment parameter based on an impulse response and/or internal output signal data, microphone input signal data over time.

The machine learning circuitry (such as the neural network module and/or the regressor module) may be configured to operate according to a machine learning scheme configured to determine a rule or a pattern or a relation that maps inputs to outputs, so that when subsequent novel inputs are provided the machine learning circuitry may, based upon the rule, pattern or relation, accurately predict the correct output. In one or more embodiments, the machine learning model may first extract one or more features from input impulse response data, such as by using signal processing methods (such as filters), statistics of the signals (such as mean, max, median, and/or quantile), and/or results from unsupervised learning methods (such as dimension reduction methods, clustering, and/or auto-encoder). The one or more features may then be fed into a regression and/or classification model that is trained using machine learning techniques.

In one or more example speakerphones, the speakerphone is configured to determine, based on the impulse response, one or more of: a first parameter indicative of a first reflection characteristic, a second parameter indicative of a second reflection characteristic, and a third parameter indicative of a third reflection characteristic. In one or more example speakerphones, the first environment parameter is based on one or more of: the first parameter, the second parameter, and the third parameter. In other words, the speakerphone may be configured to determine the environment score based on one or more of: the first parameter, the second parameter, and the third parameter. In one or more example speakerphones, the first environment parameter comprises one or more of the first parameter, the second parameter, and the third parameter.

In one or more example speakerphones, the speakerphone is configured to determine (such as estimate), based on the impulse response of the internal output signal that is outputted by the speakerphone, a direct sound, reflections, and/or reverberant parts. The direct sound, the reflections, and/or the reverberant parts may be seen as different sequences of the impulse response. In one or more example speakerphones, the first parameter indicative of a first reflection characteristic, the second parameter indicative of a second reflection characteristic, and the third parameter indicative of a third reflection characteristic may be determined based on one or more of the direct sound, the reflections, and/or the reverberant parts of the impulse response. In one or more example speakerphones, the environment score may be determined based on one or more of: the first parameter, the second parameter, and the third parameter.

In one or more example speakerphones, the speakerphone is configured to transmit, via the interface, one or more of the first parameter, the second parameter, and the third parameter. In one or more example speakerphones, the speakerphone is configured to transmit, via the interface, one or more of the first parameter, the second parameter, and the third parameter to the server device.

In one or more example speakerphones, the first parameter is a reverberation time (RT), the second parameter is a direct-to-reverberant ratio (DRR), and/or the third parameter is an early decay time (EDT). In other words, the reverberation time may be seen as the first reflection characteristic, the direct-to-reverberant ratio may be seen as the second reflection characteristic, an/or the early decay time may be seen as the third reflection characteristic. A reverberation may be seen as late reflections. In one or more example speakerphones, the first environment parameter comprises one or more of the first parameter, the second parameter, and the third parameter. In one or more example speakerphones, the first environment parameter comprises one or more of the reverberation time, the direct-to-reverberant time, and the early decay time. In one or more example speakerphones, the first environment parameter is based on one or more of the reverberation time, the direct-to-reverberant time, and the early decay time.

In one or more example speakerphones, the speakerphone may be configured to determine one or more of the reverberation time, the direct-to-reverberant time, and the early decay time by using signal processing and/or curve analysis, such as by fitting an energy curve of the impulse response.

In one or more example speakerphones, the speakerphone is configured to determine the reverberation time based on an impulse response determined based the internal output signal representing an audio signal from the far-end, such as representing speech from one or more users at the far-end. It may be appreciated, that determining the reverberation time based on actual speech from a far-end, the RT may be determined in an "online" fashion. In other words, with this approach, an estimation of the reverberation time is transparent for the user, when there is a far-end speech at some point. The reverberation time (RT) may for example comprise reverberation time 60 (RT60), such as the time that it takes for the sound pressure level to reduce by 60 decibel, dB. To determine the early decay time (EDT) may comprise to determine the time that it takes for the sound pressure level to reduce by 10 decibel, dB.

In one or more example speakerphones, the environment score may be determined based on one or more of: the reverberation time, the direct-to-reverberant time, the early decay time, the signal-to-noise ratio, and the background noise parameter. In one or more speakerphones, the environment score may be determined based on the signal-to-noise ratio and/or the background noise parameter.

In one or more example speakerphones, the first environment parameter is indicative of a size of the environment, a volume of the environment, a level of absorption of the environment, or a position of the speakerphone in the environment. In other words, the speakerphone may be configured to determine, such as using the processor and based on the impulse response, one or more of a size of the environment, a volume of the environment, a level of absorption of the environment, and/or a position of the speakerphone in the environment. In one or more example speakerphones, the first environment parameter is indicative of one or more elements present in the environment, such as building elements, objects, and/or persons as described herein. In one or more example speakerphones, the first environment parameter is indicative of a geometry of the environment, a volume of the environment, and/or an overall absorption of the environment.

In one or more example speakerphones, the speakerphone is configured to determine a second environment parameter indicative of a volume of the environment, a third environment parameter indicative of a level of absorption, and/or a fourth environment parameter indicative of a position of the speakerphone in the environment. In one or more example speakerphones, the speakerphone is configured to determine a size of the environment, such as a size of the room where the speakerphone is located, based on one or more of the first parameter, the second parameter, and the third parameter. In other words, the speakerphone is configured to determine a size of the environment, such as a size of the room where the speakerphone is located, based on one or more of the reverberation time, the direct-to-reverberant ratio, and the early decay time.

In one or more example speakerphones, the speakerphone is configured to determine a volume of the environment, such as a volume of the room where the speakerphone is located, based on one or more of the first parameter, the second parameter, and the third parameter. In other words, the speakerphone is configured to determine a size of the environment, such as a size of the room where the speakerphone is located, based on one or more of the reverberation time, the direct-to-reverberant ratio, and the early decay time.

In one or more example speakerphones, the speakerphone is configured to determine a level of absorption of the environment, such as a level of absorption of the room where the speakerphone is located, based on one or more of the first parameter, the second parameter, and the third parameter. In other words, the speakerphone is configured to determine a size of the environment, such as a size of the room where the speakerphone is located, based on one or more of the reverberation time, the direct-to-reverberant ratio, and the early decay time.

It may be appreciated that the speakerphone is configured to quantify, based on the impulse response, the reverberation time, the direct-to-reverberant ratio, and the early decay time to determine characteristics of the environment, such as characteristic of the room, such as a size of the environment, a volume of the environment, a level of absorption of the environment, and/or a position of the speakerphone in the environment.

It may for example be possible to determine whether the speakerphone is in a corner, near a wall, or in the middle of an environment, such as in the middle of a room.

In one or more example speakerphones, the environment score may be determined based on one or more of: a size of the environment, a volume of the environment, a level of absorption of the environment, and/or a position of the speakerphone in the environment.

In one or more example speakerphones, the speakerphone is configured to process, such as using the processor, the microphone input signal for provision of an external output signal. The microphone input signal may be seen as a second microphone input signal obtained at a second time. The first time and the second time may be different. The microphone input signal may be associated with one or more audio outputs in the environment, such as one or more audio outputs of the participant(s) in the environment. The external output signal may be indicative of an audio signal generated by user(s) at the near-end, such as in the environment. In other words, the external output signal may be indicative of speech from the near-end. The external output signal may be seen as the output of the speakerphone from the near-end to the far-end, based on the microphone input signal.

In one or more example speakerphones, the speakerphone is configured to control, such as using the processor, the processing of the microphone input signal based on the first environment parameter. In one or more example speakerphones, the processing of the microphone input signal may comprise a first processing of the microphone input signal for provision of the external output signal. In one or more example speakerphones, the speakerphone may be configured to control, e.g., using the echo canceller, the processing of the microphone input signal based on the impulse response. In other words, the first environment parameter may include the impulse response. The external output signal may be indicative of a noise suppressed microphone input signal, e.g., based on the first environment parameter. In other words, the first processing of the microphone input signal may comprise cancelling the noise, such as noise suppression in the microphone input signal, based on the first environment parameter. In one or more example speakerphones, the speakerphone is configured to control, such as using the processor, the processing of the microphone input signal based on one or more of the first environment parameter, a second environment parameter, a third environment parameter, a fourth environment parameter, and a fifth environment parameter.

The external output signal may be indicative of an echo suppressed microphone input signal. In other words, the first processing of the microphone input signal may comprise cancelling the echo, such as echo suppression, in the microphone input signal.

In one or more example speakerphones, the external output signal may be the output of a digital signal processing, DSP, logic. In one or more example speakerphones, the processor of the speakerphone may comprise a DSP logic.

The output signal may be indicative of noise and echo suppressed microphone input signal. In other words, the first processing of the microphone input signal may comprise cancelling the noise and the echo in the microphone input signal. In one or more example audio devices, the output signal may be based on or constituted by the output of a digital signal processing, DSP, logic.

In one or more example speakerphones, the DSP logic may comprise one or more filters to process the microphone input signals. In one or more example speakerphones, the DSP logic is configured to change one or more weights associated with the filters based on the one or more environment parameters, such as the first environment parameter. In one or more example speakerphones, the DSP logic may comprise a neural network, such as a cascading neural network, which may receive the one or more environment parameters as input. The DSP logic may process the microphone input signals based on the output being filter coefficients and/or processing scheme identifier(s) of the cascading neural network. In one or more examples, the DSP logic may be configured to select a processing scheme/filter coefficients based on the first environment parameter and/or the second environment parameter.

In one or more example speakerphones, the controlling of the processing of the microphone input signal is based on one or more of the first parameter, the second parameter, and the third parameter. In one or more example speakerphones, the controlling of the processing of the microphone input signal is based on one or more of the first reflection characteristic, the second reflection characteristic, and the third reflection characteristic. In one or more example speakerphones, the controlling of the processing of the microphone input signal is based on one or more of the reverberation time, the direct-to-reverberant time, and the early decay time.

In one or more example speakerphones, the speakerphone is configured to transmit, via the interface, the external output signal. In other words, the speakerphone is configured to transmit the external output signal via the interface to the far-end. The speakerphone may transmit the external output signal via a wireless transceiver and/or a wired connector of the speakerphone. In one or more example speakerphone, the speakerphone may transmit the external output signal to an electronic device, such as another speakerphone, a mobile phone, a tablet, a computer, a smartwatch, a server, a cloud-based server, a smart speaker and/or a loudspeaker.

In one or more example speakerphones, the speakerphone is configured to determine, based on an environment parameter, such as the first environment parameter, a conference setup recommendation. In one or more example speakerphones, the speakerphone is configured to determine, based on the first environment parameter and/or the environment score, a conference setup recommendation. The conference setup recommendation may be seen as a feedback to the user and/or an IT department regarding the acoustics of the environment. In other words, the conference setup recommendation may be seen as a feedback to the user and/or an IT department regarding the suitability of the conference setup in the environment. The conference setup recommendation may be seen as an evaluation of the acoustics of the environment and/or the suitability of the conference setup in the environment. The conference setup recommendation may be indicative of a recommendation for improving the acoustics in the environment, such as improving the acoustics of the conference setup in the environment. The conference setup recommendation may be indicative of a recommendation for improving a rendered audio quality from a microphone input signal at the near-end. The conference setup recommendation may be indicative of a recommendation for improving acoustics in the environment, such as reducing echo. The conference setup recommendation may be seen as and/or comprise an advisory action that the user of the speakerphone could do to improve the acoustics of the conference setup. The conference setup recommendation may be indicative of a recommendation for a change to the conference setup for improving acoustics in the environment, such as reducing echo. The conference setup recommendation may for example comprise text (such as a message to the user, e.g., an audio message) and/or phrases such as: "The number of speakerphones of the conference setup in the environment is not sufficient to achieve a sufficient audio quality, please provide additional speakerphones in the conference setup", "The position of the speakerphone is suboptimal, please move the speakerphone to the center of the room", "The acoustics of the conference setup in the environment is poor, please provide one or more damping elements or objects to the conference setup, such as one or more pillows, carpets, curtains, acoustic panels or the like", "If a door is opened in the room where the speakerphone is located, please close it", "the background noise level is high and prevent high quality communication. Please take action to reduce it, change to another room, and/or close the door", and/or "One or more participants are relatively far from the speakerphone(s). Please consider getting closer to the speakerphone or add additional speakerphone(s)".

In one or more example speakerphones, the speakerphone is configured to output, via the interface and/or the speaker, the conference setup recommendation.

In one or more example speakerphones, the processor of the speakerphone is configured to output, via the interface and/or the speaker, the conference setup recommendation. In other words, the speakerphone, such as using the processor, may be configured to output the conference setup recommendation in the form of a text message (such as a message to a user) and/or a phrase, an environment score, image data (such as one or more images), an audio message (e.g., outputted to the user via the speaker of the speakerphone and/or via a speaker of the electronic device), and/or a user interface as described herein. In one or more example speakerphones, the environment score is comprised in the conference setup recommendation. In one or more example speakerphones, the speakerphone is configured to determine an audio output based on the and/or indicative of the conference setup recommendation.

In one or more example speakerphones, the speakerphone is configured to output the conference setup recommendation to the memory, such as to store the conference setup recommendation in a part of the memory. In one or more example speakerphones, the speakerphone is configured to output, via the interface, the conference setup recommendation to a server device, e.g., via an electronic device as disclosed herein and/or via a global network such as the internet and/or a local network. For example, the speakerphone may be configured to output the conference setup recommendation to an IT department in charge of the conference setup in the environment.

In one or more example speakerphones, the speakerphone is configured to transmit the conference setup recommendation to the server device.

In one or more example speakerphones, the processor comprises an echo canceller, such as an echo canceller module. In one or more example speakerphones, to determine the impulse response comprises to reduce, using the echo canceller, one or more echo components from the microphone input signal. In one or more example speakerphones, the speakerphone is configured to reduce, such as using the echo canceller and based on the impulse response and/or the first environment parameter, one or more components from the microphone input signal. The reduction of one or more echo components from the microphone input signal may be done subsequently to determining the impulse response. In one or more example speakerphones, the processor comprises a noise reductor for reducing noise from the microphone input signal, such as a noise reductor module.

In other words, the processing pipeline of the speakerphone includes an echo canceller. The echo canceller may be configured to remove an echo path from the speaker of the speakerphone to the one or more microphone(s). This removal may be based on an estimate of the impulse response from the speaker to the one or more microphone(s). It may be appreciated, that the estimated impulse response provides an insight of the acoustic sound field on the environment, such as room, where the speakerphone is located. It may be appreciated, that the impulse response may be updated in time, based on changes of the conference setup in the environment. In other words, words, the estimation of the impulse response may be updated to reflect changes in the sound field.

In one or more example speakerphones, the impulse response is estimated from the echo canceller (such as echo canceller processing block), to suppress echo. For example, the estimation of the impulse response may be a step in the processing of reducing echo components, such as suppressing echoes. In one or more example speakerphones, the speakerphone is configured to determine, using the echo canceller and based on the internal output signal and the microphone input signal, the impulse response.

In one or more example speakerphones, the echo canceller comprises one or both of a linear echo canceller and a residual echo suppressor. It may be appreciated, that the linear echo canceller, LEC, is configured to model the echo of the environment. The speakerphone may be configured to determine an echo signal using the LEC, based on the impulse response. The speakerphone may use a finite impulse response filter, FIR filter, for determining the impulse response. The residual echo suppressor, RES, may be configured to reduce echo that remain after the linear echo canceller, LEC, has been used to reduce echo. For example, the residual echo suppressor, RES, may be used to reduce echo that are non-linear with regard to a far-end signal. For example, the residual echo suppressor, RES, may be used to reduce distortions introduced by the speaker in the speakerphone, and/or used when the length of the LEC filter(s) is limited.

In one or more example speakerphones, to obtain the internal output signal comprises to obtain a test signal. In one or more example speakerphones, the internal output signal is based on the test signal. In one or more example speakerphones, the speakerphone is configured to output, such as via the speaker and using the processor, an internal output signal based on the test signal, such as the internal output signal comprising and/or being indicative of the test signal. In one or more example speakerphones, the internal output signal is based on a test signal obtained from the memory and/or the server device.

In one or more example speakerphones, the speakerphone is configured to determine the impulse response based on the test signal. In one or more example speakerphones, the speakerphone is configured to determine the impulse response using the processor and based on the test signal, the internal output signal and the microphone input signal. The test signal may be seen as a signal used to set up the speakerphone before using it, e.g., when there is no speech. This may be denoted as an offline determination of the impulse response. The test signal may comprise and/or be indicative of a dedicated sequence of sound, such as a sine sweep for example. A test signal may be outputted before a meeting, such as before each meeting, in order to determine the impulse response before the meeting. This may be done for verifying the suitability of a conference setup in an environment before starting a meeting and/or for a routine check. In other words, this may allow to pre-configure a conference setup based on one or more environment parameters and/or environment score.

In one or more example speakerphones, the speakerphone is configured to determine the reverberation time, RT, based on the test signal.

In one or more example speakerphones, the speakerphone is configured to determine a signal-to-noise ratio based on the test signal. For example, the test signal may comprise turning on and off a white noise audio signal, which may be used to determine the signal-to-noise ratio.

In one or more example speakerphones, the speakerphone is configured to determine, such as using the processor, a background noise parameter, e.g., a first background noise parameter. The speakerphone may be configured to determine a plurality of background noise parameters. In one or more example speakerphones, the speakerphone is configured to determine, based on the internal output signal and the microphone input signal, the background noise parameter. The background noise parameter may be seen as a parameter indicative of a background noise in the environment. In one or more example speakerphones, the speakerphone is configured to determine, based on the first environment parameter and the background noise parameter, the environment score. In one or more example speakerphones, the speakerphone is configured to determine a signal-to-noise ratio based on the background noise parameter. For example, the speakerphone is configured to determine the signal-to-noise ratio based on the background noise parameter, the test signal, and/or the microphone input signal.

In one or more example speakerphones, to obtain the internal output signal comprises to obtain a far-end input signal from a far-end communication device. The far-end input signal may be indicative of speech from one or more users at the far-end. In one or more example speakerphones, the internal output signal is based on the far-end input signal.

In one or more example speakerphones, the processor comprises a speech detector module configured to detect speech based on the microphone input signal. In one or more example speakerphones, the speakerphone is configured to detect, using the speech detector, whether the microphone input signal comprises speech or not. In other words, the speakerphone is configured to detect, using the speech detector, whether speech is present at the near-end. The speech detector may be configured to detect segments where speech is present by determining statistics of the speech energy.

In one or more example speakerphones, the speakerphone is configured to, in accordance with a detection of no speech and a detection of no internal output signal, determine a background noise parameter, e.g., a second background noise parameter. In other words, when there is no speech present and that there is no far-end signal, e.g., the far-end is silent, it may be possible to determine a background noise parameter. For example, when there is no speech detected in the microphone input signal and that there is no far-end signal, the speakerphone is configured to determine a background noise parameter. Formulated differently, when it is detected that the microphone input signal is not indicative of speech and that no internal output signal is outputted, e.g., the microphone input signal is not indicative of an internal audio output signal, the speakerphone is configured to determine a background noise parameter.

In one or more example speakerphones, the speakerphone is configured to, in accordance with a detection of speech and a detection of no internal output signal, determine a speech parameter. In other words, when there speech present and that there is no far-end signal, e.g., the far-end is silent, it may be possible to determine a speech parameter. The speech parameter may be indicative of speech from one or more users at the near-end.

In one or more example speakerphones, the speakerphone is configured to determine, based on the background noise parameter and the speech parameter, a signal-to-noise ratio.

In one or more example speakerphones, the speakerphone is configured to determine, based on the first environment parameter and the signal-to-noise ratio, the environment score. In one or more example speakerphones, the speakerphone is configured to determine, based on the signal-to-noise ratio, the first environment parameter. In one or more example speakerphones, the speakerphone is configured to determine, based on the signal-to-noise ratio, the impulse response.

In one or more example speakerphones, the speakerphone is configured to obtain, such as using the processor and via the interface, an environment configuration associated with the environment. In other words, the speakerphone may be configured to obtain information regarding the environment where the speakerphone is located. The speakerphone may be configured to obtain information regarding the conference setup in the environment where the speakerphone is located.

In one or more example speakerphones, the speakerphone is configured to obtain, such as via the interface, a user input indicative of one or more properties of the environment. In one or more example speakerphones, the environment configuration is based on the user input.

The environment configuration may for example be based on one or more of user input and/or image data. By providing image data, e.g., comprising one or more images of the environment, such as of the conference setup, where the speakerphone is located, the speakerphone may be configured to determine an environment configuration based on the image data. The image data may be provided by a user, e.g., taking a photo of the environment where the speakerphone is located, such as a photo of a meeting room. The environment configuration may be indicative of one or more elements of the environment as described herein. The environment configuration may comprise information such as a size of an environment, e.g., dimensions of a room, position of the speakerphone in the environment, and/or objects in the environment. In other words, words, the user input may provide information such as a size of an environment, e.g., dimensions of a room, position of the speakerphone in the environment, and/or objects in the environment. A user may provide the user input via the electronic device as disclosed herein. For example, the user may be prompted to provide a user input indicative of one or more properties of the environment via an accessory device of the user. The environment configuration may be used to validate one or more environment parameters, such as to validate one or more of a size of the environment, a volume of the environment, a level of absorption of the environment, and a position of the speakerphone in the environment. In one or more example speakerphones, the environment configuration may be obtained via the one or more microphones, e.g., using the speech detector. For example, the user may provide information regarding the environment configuration orally.

In one or more example speakerphones, the speakerphone is configured to transmit, such as using the processor and/or via the interface, the environment configuration to the server device.

A server device is disclosed. The server device comprises one or more processors comprising machine learning circuitry configured to operate according to a machine learning model. The description of the machine learning model of the speakerphone may also apply to the description of the machine learning model of the server device. The server device comprises one or more interfaces. The server device comprises a memory. The server device is configured to obtain, via the one or more interfaces, from a speakerphone, an impulse response associated with an environment (of the speakerphone) and/or one or more environment parameters indicative of acoustics of the environment (of the speakerphone). In one or more example server devices, the server device is configured to obtain, via the one or more interfaces, from a plurality of speakerphones, a plurality of impulse responses associated with a plurality of environments and/or a plurality of environment parameters indicative of acoustics of the environments. The server device is configured to train the machine learning model based on the impulse response(s) and/or the environment parameters for provision of an updated machine learning model. The server device is configured to transmit the updated machine learning model to a speakerphone. It is an advantage that the server device is configured to obtain impulse responses and/or environment parameters from a plurality of speakerphones. The server device may train the machine learning model based on a large amount of data, while avoiding privacy and/or confidentiality issues by only obtaining impulse responses and/or environment parameters.

In one or more example server devices, the server device is configured to determine, based on the impulse response and/or the one or more environment parameters, such as the first environment parameter, a simulated impulse response associated with a simulated environment. A simulated impulse response may be seen as a synthetic impulse response replicating an impulse response of one or more environments, such as rooms. A simulated impulse response may replicate a first environment and environments similar to the first environment.

In other words, the extracted data related to the acoustics of the environment may be used to drive a generation of a synthetic impulse response.

In one or more example server devices, the server device is configured to train the machine learning model based on the simulated impulse response for provision of an updated machine learning model. In one or more example server devices, the server device is configured to transmit the updated machine learning model to a speakerphone, such as to one or more speakerphones. A simulated impulse response may be used to improve the echo canceller and/or the noise reductor.

In one or more example server devices, the updated machine learning model is an environment parameter detection model. The environment parameter detection model may be seen as a machine learning model configured to detect and/or extract one or more parameters indicative of acoustics of an environment. In one or more example server devices, the server device is configured to transmit the updated machine learning model to a speakerphone, such as to one or more speakerphones.

In one or more example server devices, the updated machine learning model is an echo canceller model. The echo canceller model may be seen as a machine learning model configured to detect and/or extract one or more parameters and/or features indicative of echo components in the microphone input signal. In other words, the echo canceller model may be configured to reduce one or more echo components from the microphone input signal. In one or more example server devices, the server device is configured to transmit the updated machine learning model to a speakerphone, such as to one or more speakerphones.

A server device may be configured on a cloud, such as a cloud network. Different operations configured to be performed by the speakerphone, the server device, and/or the system as disclosed herein may be performed at different devices, such as at the speakerphone and/or at the server device.

A method of operating a speakerphone system is disclosed. The speakerphone system comprises one or more speakerphones including a first speakerphone, and an electronic device. The method comprises obtaining, using the first speakerphone, an internal output signal for provision of an internal audio output signal in an environment. The method comprises outputting, using the first speakerphone and based on the internal output signal, an internal audio output signal in the environment. The method comprises obtaining, using the first speakerphone, a microphone input signal. The method comprises determining, using the first speakerphone and based on the internal output signal and the microphone input signal, an impulse response associated with the environment. The method comprises determining, using the first speakerphone and based on the impulse response, one or more environment parameters, e.g., indicative of acoustics of the environment, the one or more environment parameters including a first environment parameter. The method comprises determining, based on the first environment parameter, an environment score, e.g., indicative of suitability of a conference setup in the environment. The method comprises outputting, using the first speakerphone, the environment score.

A method of operating a speakerphone system is disclosed. The speakerphone system comprises one or more speakerphones including a first speakerphone. The speakerphone system comprises a server device. The method comprises obtaining, using the first speakerphone, an internal output signal for provision of an internal audio output signal in an environment. The method comprises outputting, using the first speakerphone and based on the internal output signal, an internal audio output signal in the environment. The method comprises obtaining, using the first speakerphone, a microphone input signal. The method comprises determining, using the first speakerphone and based on the internal output signal and the microphone input signal, an impulse response associated with the environment. The method comprises determining, using the first speakerphone and based on the impulse response, one or more environment parameters indicative of acoustics of the environment, the one or more environment parameters including a first environment parameter. The method comprises transmitting, from the first speakerphone, the impulse response and/or the first environment parameter to the server device.

A method of operating a speakerphone system comprising one or more speakerphones including a first speakerphone, and a server device. The method comprises obtaining, from the first speakerphone, an impulse response associated with an environment and/or one or more environment parameters indicative of acoustics of the environment. The method comprises training the machine learning model based on the impulse response and/or the environment parameters for provision of an updated machine learning model. The method comprises transmitting the updated machine learning model to a speakerphone.

A method of operating a speakerphone system comprising a plurality of speakerphones and a server device. The method comprises obtaining, from the plurality of speakerphones, a plurality of impulse responses associated with a plurality of environments and/or a plurality of environment parameters indicative of acoustics of the environments. The method comprises training the machine learning model based on the impulse responses and/or the environment parameters for provision of an updated machine learning model. The method comprises transmitting the updated machine learning model to a speakerphone.

It is to be understood that a description of a feature in relation to the speakerphone, the server device, and/or the electronic device(s) is also applicable to the corresponding feature in the system(s), the method(s) of operating a speakerphone system, and/or the method(s) of operating a server device as disclosed herein.

FIG. 1 schematically illustrates an example system, such as a speakerphone system 2 according to the present disclosure. The speakerphone system 2 may be seen as a system with environment acoustics characterization. The speakerphone system 2 comprises a speakerphone 10 comprising a memory 10A, an interface 10B, a processor 100, one or more speakers 10D, and one or more microphones, including a first microphone 10E. The speakerphone 10 may be seen as an audio device configured to obtain audio signals, output audio signals, and process audio signals. The speakerphone may be seen as a conference speakerphone, e.g., configured to be used by a party (such as one or more users 1A at a near-end) to communicate with one or more other parties (such as one or more users 1B at a far-end). The speakerphone 10 may be seen as a smart speakerphone. The speakerphone 10 may be used for a conference and/or a meeting between two or more parties being remote from each other. The speakerphone may be used by one or more users in a vicinity of where the speakerphone 10 is located, also referred to as a near-end.

Optionally, the speakerphone system 2 comprises a server device 20. The server device comprises a memory 20A, an interface 20B (such as one or more interfaces), and a processor 20C (such as one or more processors). Optionally, the server device 20, such as the processor 20C, comprises machine learning circuitry 21 configured to operate according to a machine learning model. In one or more example systems, the system 2 comprises one or more speakerphones, such as a plurality of speakerphones, including speakerphone 10.

Optionally, the speakerphone system 2 comprises an electronic device 60. The electronic device 60 may for example be or comprise a mobile phone, such as a smartphone, a smart-watch, a conference hub, a smart-tv, smart-speakers, a tablet, a computer, such as a laptop computer or PC, or a tablet computer. In other words, the electronic device 60 may for example be a user device of a user 1, 1A, such as a mobile phone or a computer, configured to communicate with the speakerphone 10. In one or more example systems and/or speakerphones, the accessory device may be seen as a user accessory device, such as a mobile phone, a smart watch, a tablet, and/or a wearable gadget.

Optionally, the speakerphone system 2 comprises a far-end communication device 30. The communication device 30 may be seen as a communication device used by one or more far-end users 1, 1B to communicate with the one or more users 1, 1A at the near-end, e.g., via a network 40 such as global network, e.g. the internet, and/or a local network. The communication device 30 may be configured to obtain 38 a microphone input signal indicative of speech from one or more users 1B at the far-end. The communication device 30 may be configured to process the microphone input signal for provision of an external output signal. The communication device 30 may be configured to transmit 22 the external output signal to the speakerphone 10, e.g., via the network 40. The communication device 30 may be configured to receive 24 the external output signal from the speakerphone 10. The communication device 30 may be configured to output 36, to the user 1B at the far-end, an internal output signal based on the external output signal from the speakerphone 10.

The speakerphone 10 is configured to obtain 14, such as using the processor 10C and via the interface 10B, an internal output signal for provision 6 of an internal audio output signal in an environment. In one or more example speakerphones, the speakerphone 10 is configured to obtain 14 the internal output signal from a far-end, such as a far-end party or user(s) 1B, e.g., from the communication device 30. In one or more example speakerphones, the speakerphone 10 is configured to obtain 14, 18 the internal output signal from the memory 10A and/or from the server device 20. The internal output signal may be indicative of an audio signal generated by user(s) 1B at the far-end. In other words, the internal output signal may be indicative of speech from the far-end. In one or more example speakerphones, the internal output signal is based on a test signal obtained from the memory 10A and/or the server device 20.

The speakerphone 10 is configured to output 6, such as using the speaker 10D and based on the internal output signal, the internal audio output signal in the environment. In other words, the speakerphone 10 may be configured to output 6, via the speaker 10D and based on the internal output signal, the internal audio output signal in the environment. The internal audio output signal may be seen as an output of the speaker 10D at a near-end where the speakerphone 10 and the user(s) 1A of the speakerphone are located.

The speakerphone 10 is configured to obtain, using the first microphone 10E, a microphone input signal. In one or more example speakerphones, the speakerphone 10 is configured to obtain 4, such as using the processor 100 and via the interface 10B, a microphone input signal from one or more microphones, such as the first microphone 10E, a second microphone, a third microphone and/or a fourth microphone. In one or more example speakerphones, the microphone input signal may be a combined input signal obtained from two or more of the first microphone 10E, the second microphone, the third microphone, and the fourth microphone. The microphone input signal may be representative of a direct path of an internal audio output signal from the speaker 10D to a microphone, such as the first microphone 10E, a reverberation of an internal audio output signal from the speaker 10D, such as a reverberation in the environment of an internal audio output signal outputted from the speaker 10D, and/or a user impulse response, such as direct path and/or reverberation of an audio signal outputted from the user 1A. In one or more example speakerphones, the microphone input signal may be indicative of an audio signal generated by user(s) 1A of the speakerphone 10 in the environment. In one or more example speakerphones, the microphone input signal may be indicative of an audio signal generated by the user(s) 1A of the speakerphone 10 while using the speakerphone 10. In other words, the microphone input signal may be indicative of user speech.

The speakerphone 10 is configured to determine, using the processor 10C and based on the internal output signal and the microphone input signal, an impulse response associated with the environment. The impulse response may be seen as an acoustic impulse response. The impulse response may be seen as an impulse response between the speaker

10D, e.g., being an excitation source, of the speakerphone 10D and the microphone(s) of the speakerphone, such as the first microphone 10E. The impulse response may be influenced by the speakerphone 10 itself and the environment, such as room, where the speakerphone 10 is located. It may be appreciated that the impulse response reflects one or more acoustic paths from the speaker to the microphone(s), such as first microphone 10E.

The speakerphone 10 is configured to determine, such as using the processor 10C and based on the impulse response, one or more environment parameters indicative of acoustics of the environment. In one or more example speakerphones, the one or more environment parameters include a first environment parameter. In other words, the speakerphone 10 may be configured to determine, such as using the processor 100 and based on the impulse response, a first environment parameter.

The speakerphone 10 is configured to determine, such as using the processor 10C and based on the first environment parameter, an environment score indicative of a suitability of a conference setup in the environment. The environment score may be seen as an evaluation of suitability of a conference setup in the environment where the speakerphone is located. In other words, the environment score may be seen as a level of suitability of a conference setup in the environment. For example, the environment score may be indicative of a level of an audio quality, such as an audio quality rendered at the far-end, such as for the user 1B at the far-end, when using the speakerphone 10 with the current conference setup in the environment. In other words, the environment score may give an indication of a level of audio quality, such as speech quality, that can be rendered at the far-end when using the speakerphone 10 with the current conference setup in the environment.

In one or more example speakerphones, the speakerphone 10 is configured to transmit 13, via the interface 10B, the impulse response and/or the first environment parameter to the server device 20. The server device 20 may be configured to receive 16, via the interface 20B, the impulse response and/or the first environment parameter. In one or more example speakerphones, the speakerphone 10 is configured to transmit 13, via the interface 10B, the environment score to the server device 20.

In one or more example speakerphones, the speakerphone 10 is configured to output the environment score. In one or more example speakerphones, the speakerphone 10 is configured to output 6, 13 such as via the speaker 10D and/or the interface 10B and using the processor 10C, the environment score. In one or more example speakerphones, the speakerphone 10 is configured to output the environment score to the memory 10A, such as to store the environment score in a part of the memory 10A. In one or more example speakerphones, the speakerphone 10 is configured to output 13, via the interface 10B, the environment score to the server device 20, e.g., via the electronic device 60 as disclosed herein and/or via the network 40, e.g., a global network such as the internet and/or a local network. For example, the speakerphone 10 may be configured to output the environment score to an IT department in charge of the conference setup in the environment. In one or more example speakerphones, to output the environment score comprises to output 6, e.g., to the user 1A and via the speaker 10D of the speakerphone 10, an audio signal representing the environment score.

In one or more example speakerphones, to output the environment score comprises to display, e.g., via an interface of the electronic device 60 as disclosed herein, a user interface representing the environment score. In one or more example speakerphones, the speakerphone 10 may comprise a display (not shown), and to output the environment score comprises to display 6, e.g., via the display of the speakerphone 10, a user interface representing the environment score.

In one or more example speakerphones, the processor 10C comprises machine learning circuitry (such as machine learning circuitry 74 of FIG. 2) configured to operate according to a machine learning model. In one or more example speakerphones, to determine the one or more environment parameters comprises to determine the one or more environment parameters, based on the impulse response, using the machine learning model.

In one or more example speakerphones, the speakerphone 10 is configured to transmit 13, via the interface 10B, one or more of the first parameter, the second parameter, and the third parameter. In one or more example speakerphones, the speakerphone 10 is configured to transmit 13, via the interface 10B, one or more of the first parameter, the second parameter, and the third parameter to the server device 20.

In one or more example speakerphones, the first environment parameter is indicative of a size of the environment, a volume of the environment, a level of absorption of the environment, or a position of the speakerphone 10 in the environment.

In one or more example speakerphones, the speakerphone 10 is configured to process, such as using the processor 100, the microphone input signal for provision of an external output signal. The external output signal may be indicative of an audio signal generated by user(s) 1A at the near-end, such as in the environment. In other words, the external output signal may be indicative of speech from the near-end. The external output signal may be seen as the output 13 of the speakerphone 10 from the near-end to the far-end, based on the microphone input signal.

In one or more example speakerphones, the speakerphone 10 is configured to control, such as using the processor 100, the processing of the microphone input signal based on the first environment parameter.

In one or more example speakerphones, the speakerphone 10 is configured to transmit 13, via the interface 10B, the external output signal, e.g., to the communication device 30 via the network 40.

In one or more example speakerphones, the speakerphone 10 is configured to determine, based on an environment parameter, such as the first environment parameter, a conference setup recommendation. In one or more example speakerphones, the speakerphone 10 is configured to output 6, 13 via the interface 10B and/or the speaker 10D, the conference setup recommendation.

In one or more example speakerphones, the speakerphone 10 is configured to transmit 13 the conference setup recommendation to the server device 20, e.g., via the network 40.

In one or more example speakerphones, to obtain the internal output signal comprises to obtain a test signal. In one or more example speakerphones, the internal output signal is based on the test signal. In one or more example speakerphones, the speakerphone 10 is configured to output 6, such as via the speaker 10D and using the processor 10C, an internal output signal based on the test signal, such as the internal output signal comprising and/or being indicative of the test signal. In one or more example speakerphones, the internal output signal is based on a test signal obtained from the memory 10A and/or the server device 20.

In one or more example speakerphones, the speakerphone 10 is configured to determine the impulse response based on the test signal.

In one or more example speakerphones, the speakerphone 10 is configured to determine, such as using the processor 100, a background noise parameter, e.g., a first background noise parameter.

In one or more example speakerphones, to obtain the internal output signal comprises to obtain 14, 22 a far-end input signal from a far-end communication device 30. The far-end input signal may be indicative of speech from one or more users 1B at the far-end. In one or more example speakerphones, the internal output signal is based on the far-end input signal.

In one or more example speakerphones, the speakerphone 10 is configured to obtain 4, 14, such as using the processor 10C and via the interface 10B, an environment configuration associated with the environment. In other words, the speakerphone 10 may be configured to obtain information regarding the environment where the speakerphone 10 is located. The speakerphone 10 may be configured to obtain information regarding the conference setup in the environment where the speakerphone 10 is located.

In one or more example speakerphones, the speakerphone 10 is configured to obtain 4, such as via the interface 10B, a user input 4 indicative of one or more properties of the environment. In one or more example speakerphones, the environment configuration is based on the user input 4.

In one or more example speakerphones, the speakerphone 10 is configured to transmit 13, such as using the processor 100 and/or via the interface 10B, the environment configuration to the server device 20, e.g., via the network 40.

In one or more example server devices, the server device 20 is configured to obtain 16, via the one or more interfaces 20B, from a speakerphone, such as speakerphone 10, an impulse response associated with an environment of the speakerphone and/or one or more environment parameters indicative of acoustics of the environment of the speakerphone. In one or more example server devices, the server device 20 is configured to obtain 16, via the one or more interfaces 20B, from a plurality of speakerphones, a plurality of impulse responses associated with a plurality of environments and/or a plurality of environment parameters indicative of acoustics of the environments. The server device 20 is configured to train the machine learning model based on the impulse response(s) and/or the environment parameters for provision of an updated machine learning model. The server device 20 is configured to transmit 18 the updated machine learning model to a speakerphone, such as to speakerphone 10.

In one or more example server devices, the server device 20 is configured to determine, based on the impulse response and/or the one or more environment parameters, such as the first environment parameter, a simulated impulse response associated with a simulated environment.

Figure 2:
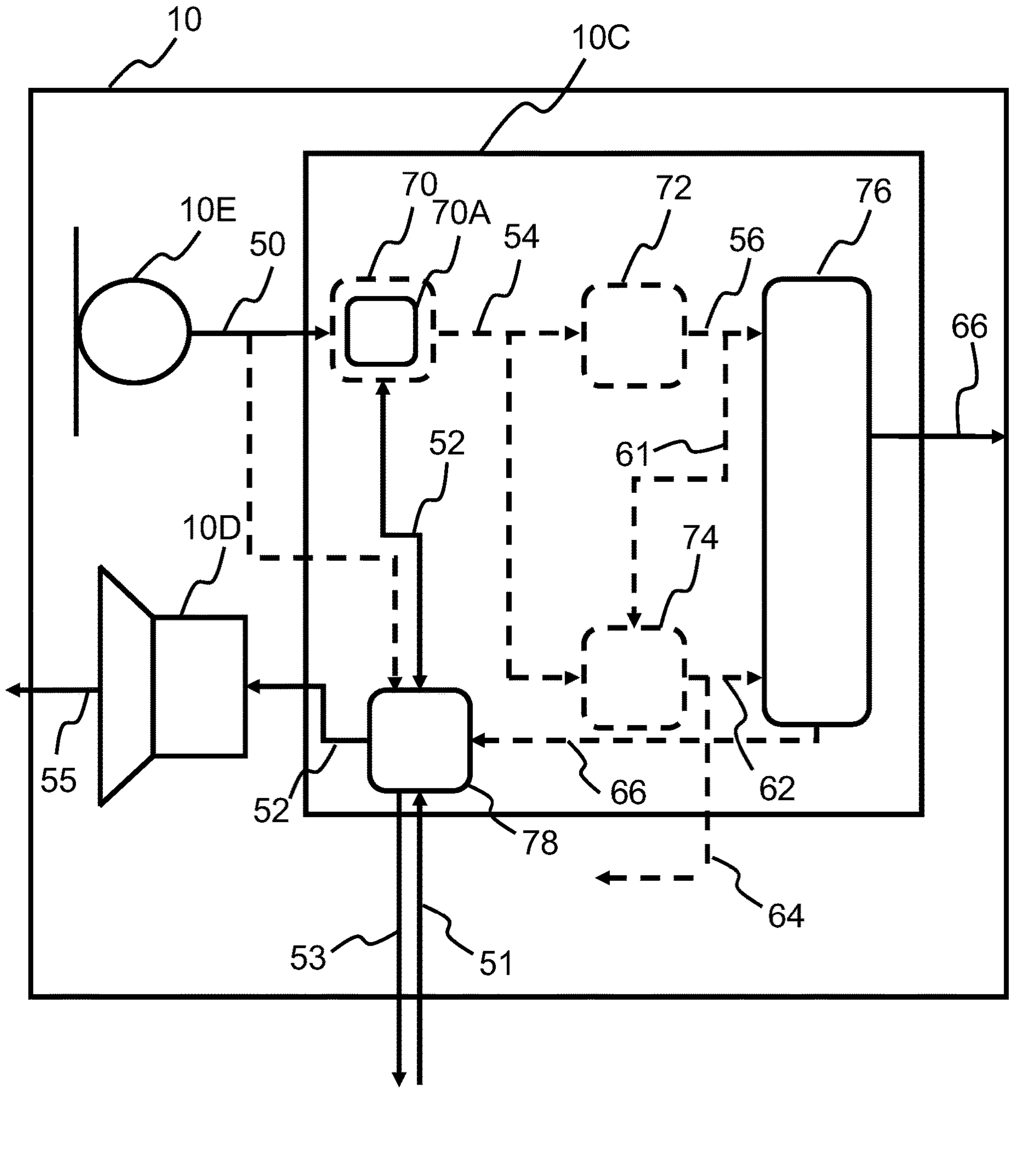
Figure 3A:
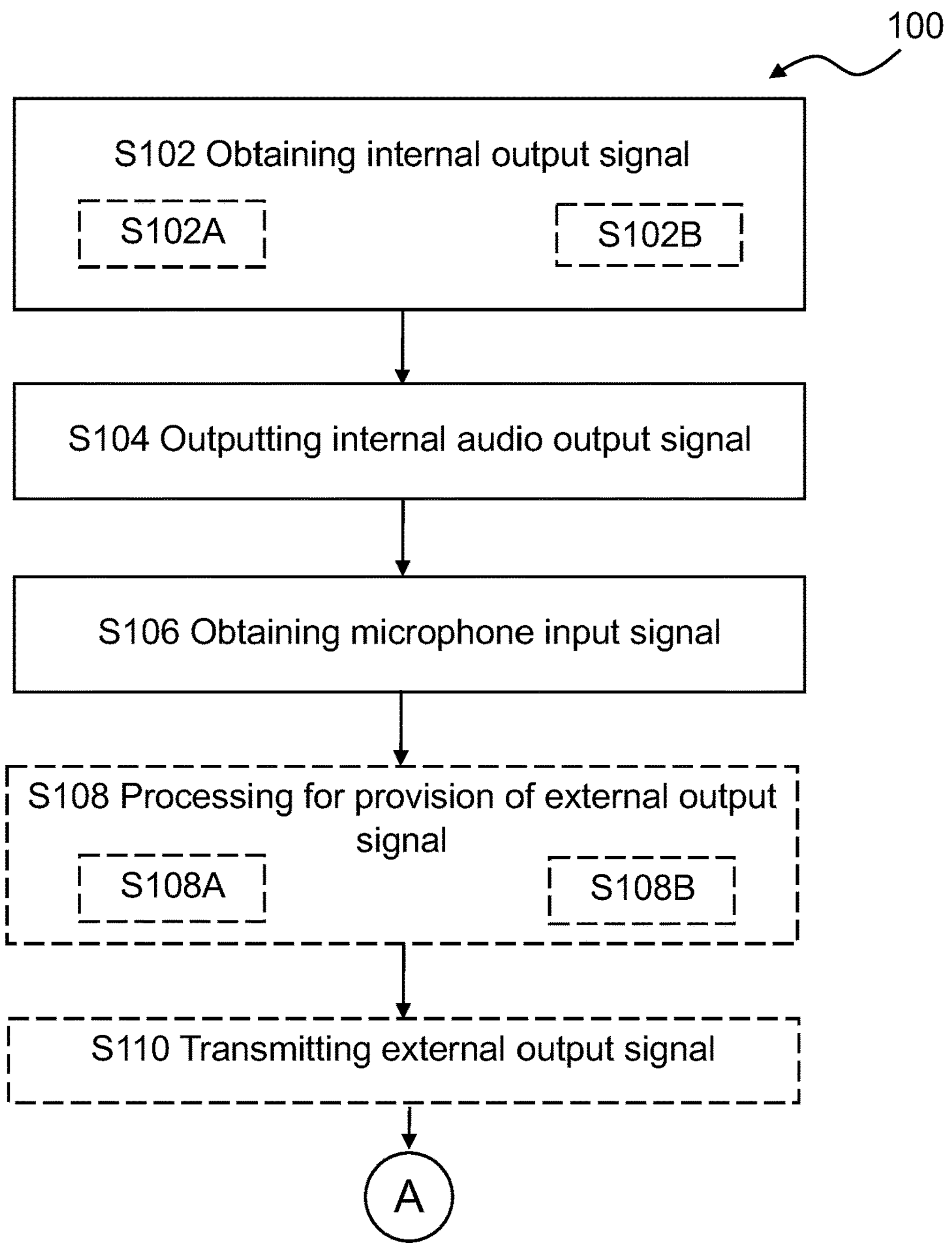
FIGS. 3A-3D is a flow chart of an example method according to the present disclosure.
Figure 3B:
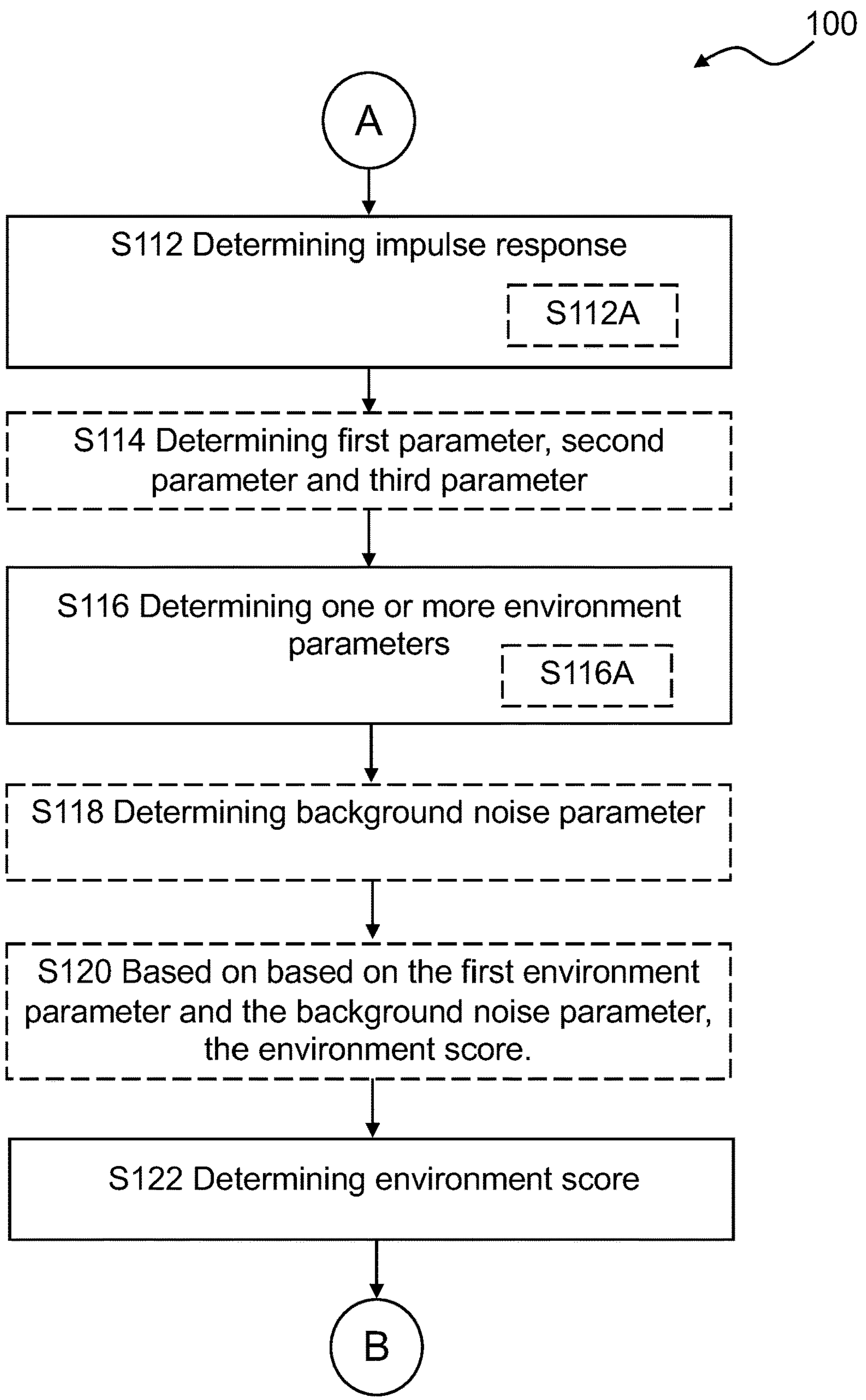
Figure 3C:
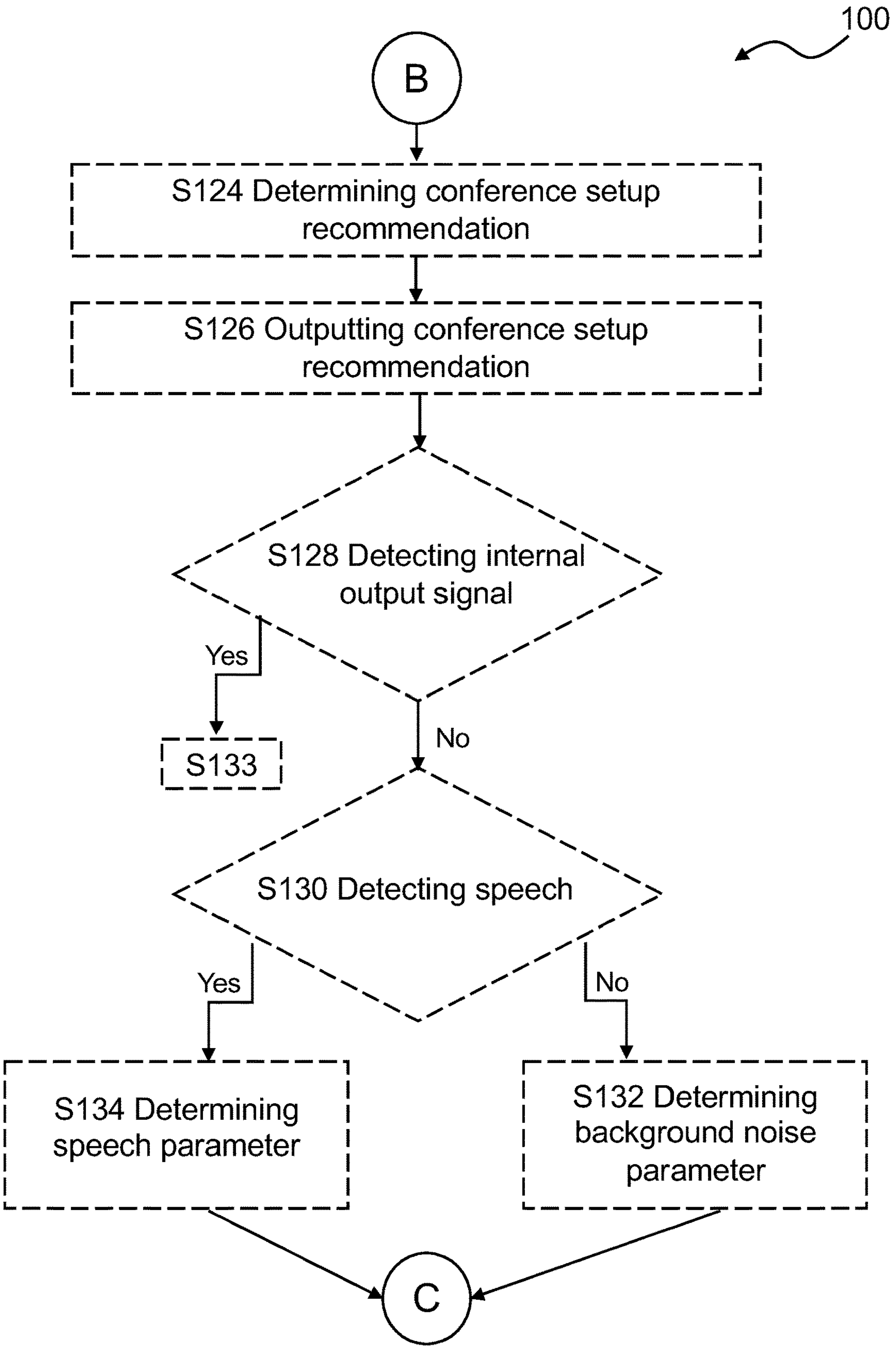
Figure 3D:
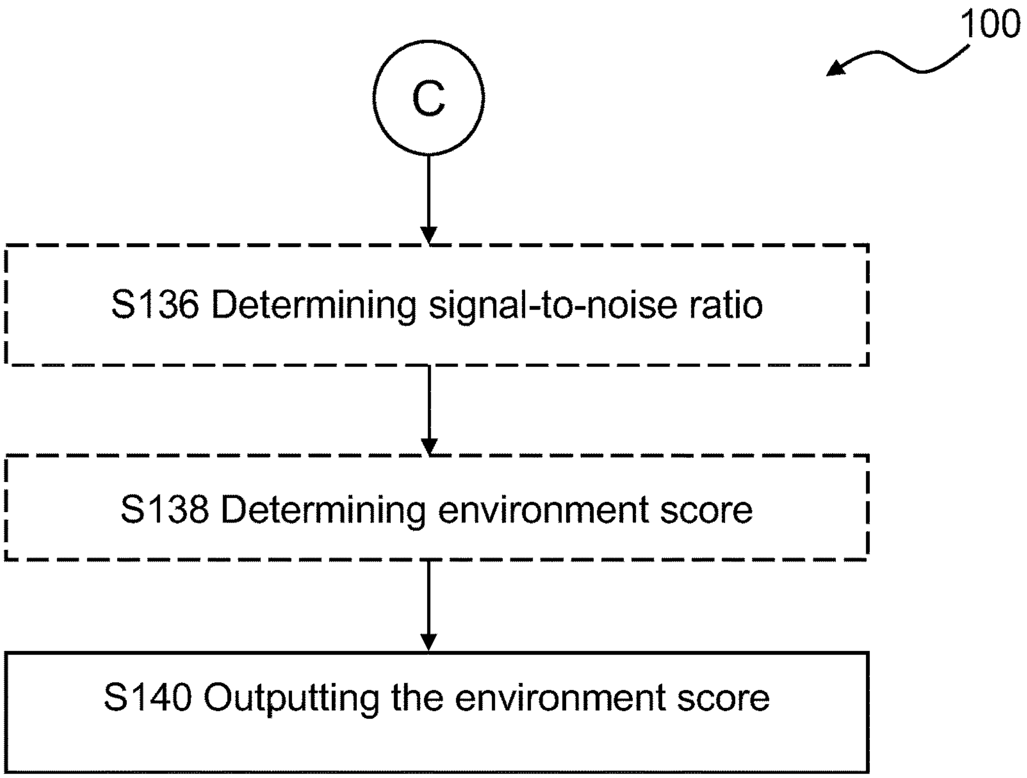
Figure 4A:
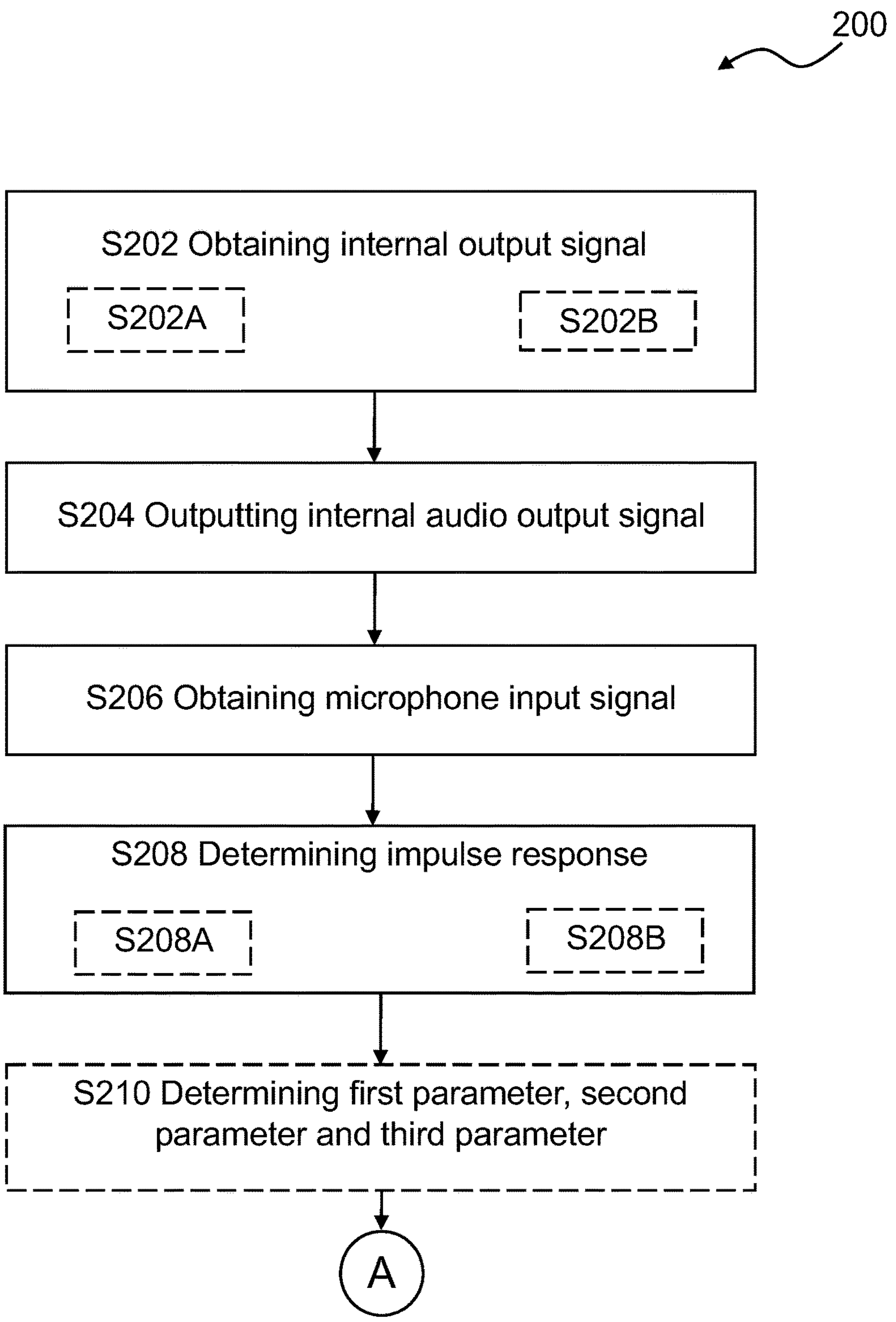
FIGS. 4A-4D is a flow chart of an example method according to the present disclosure.
Figure 4B:
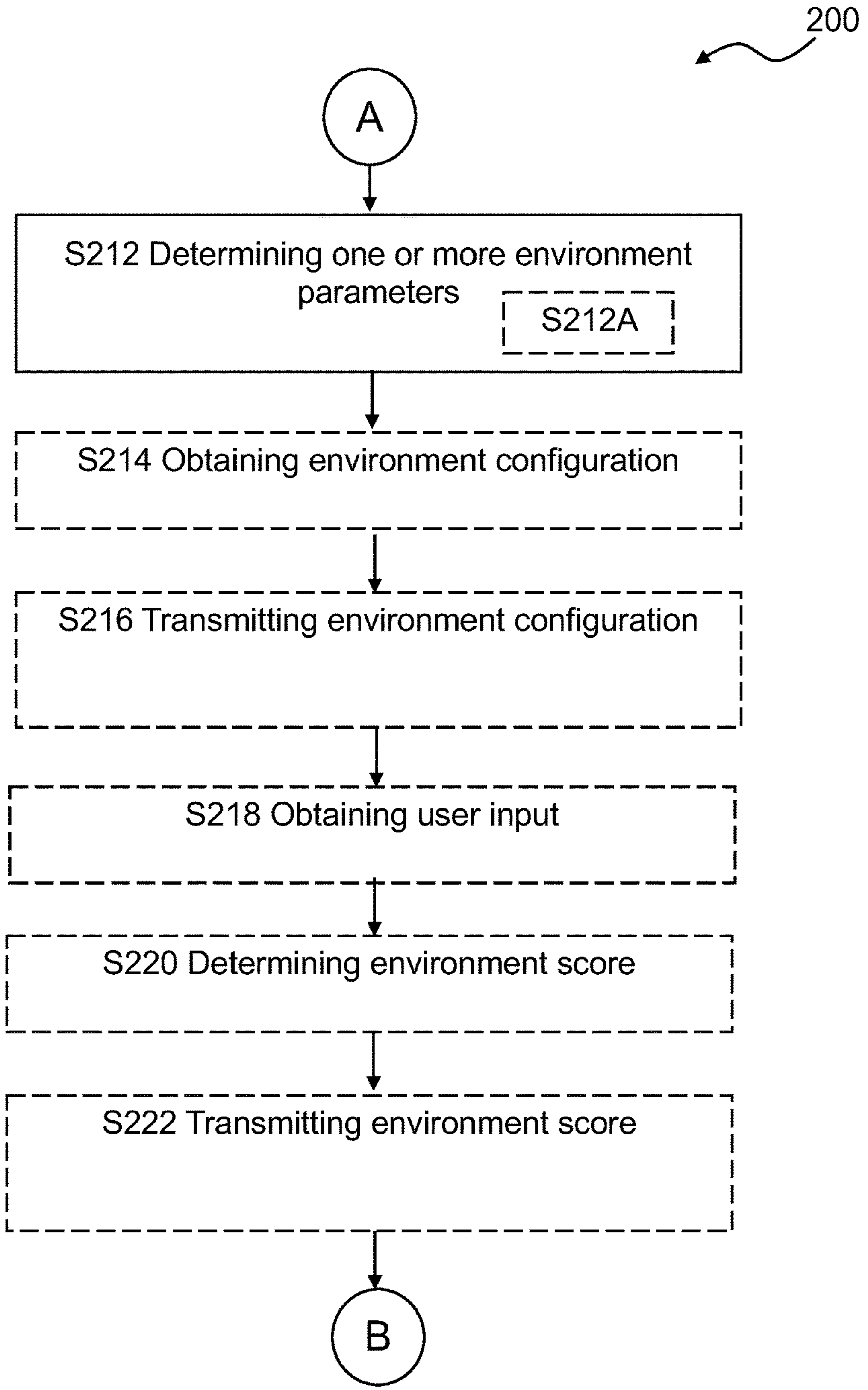
Figure 4C:
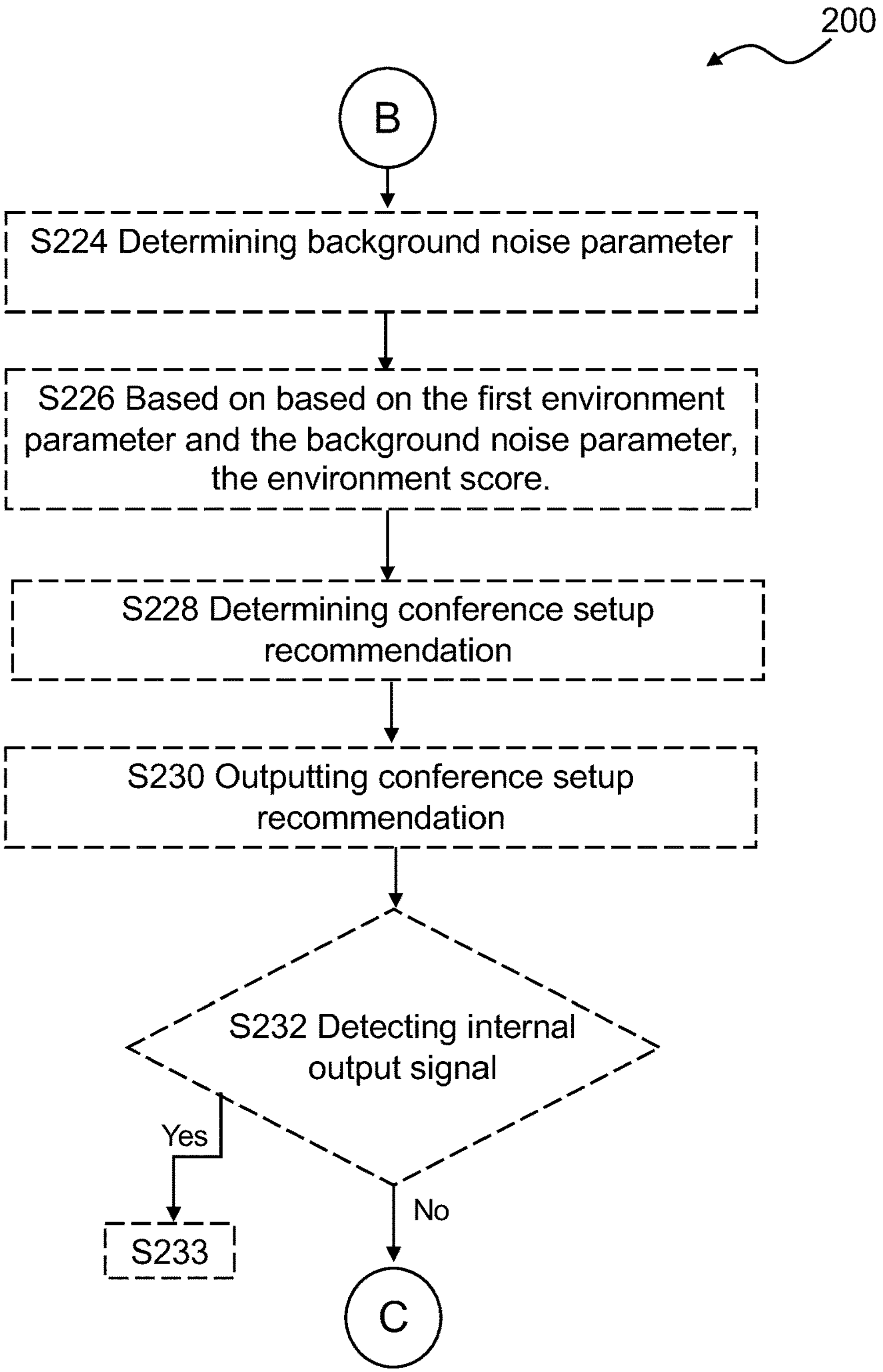
Figure 4D:
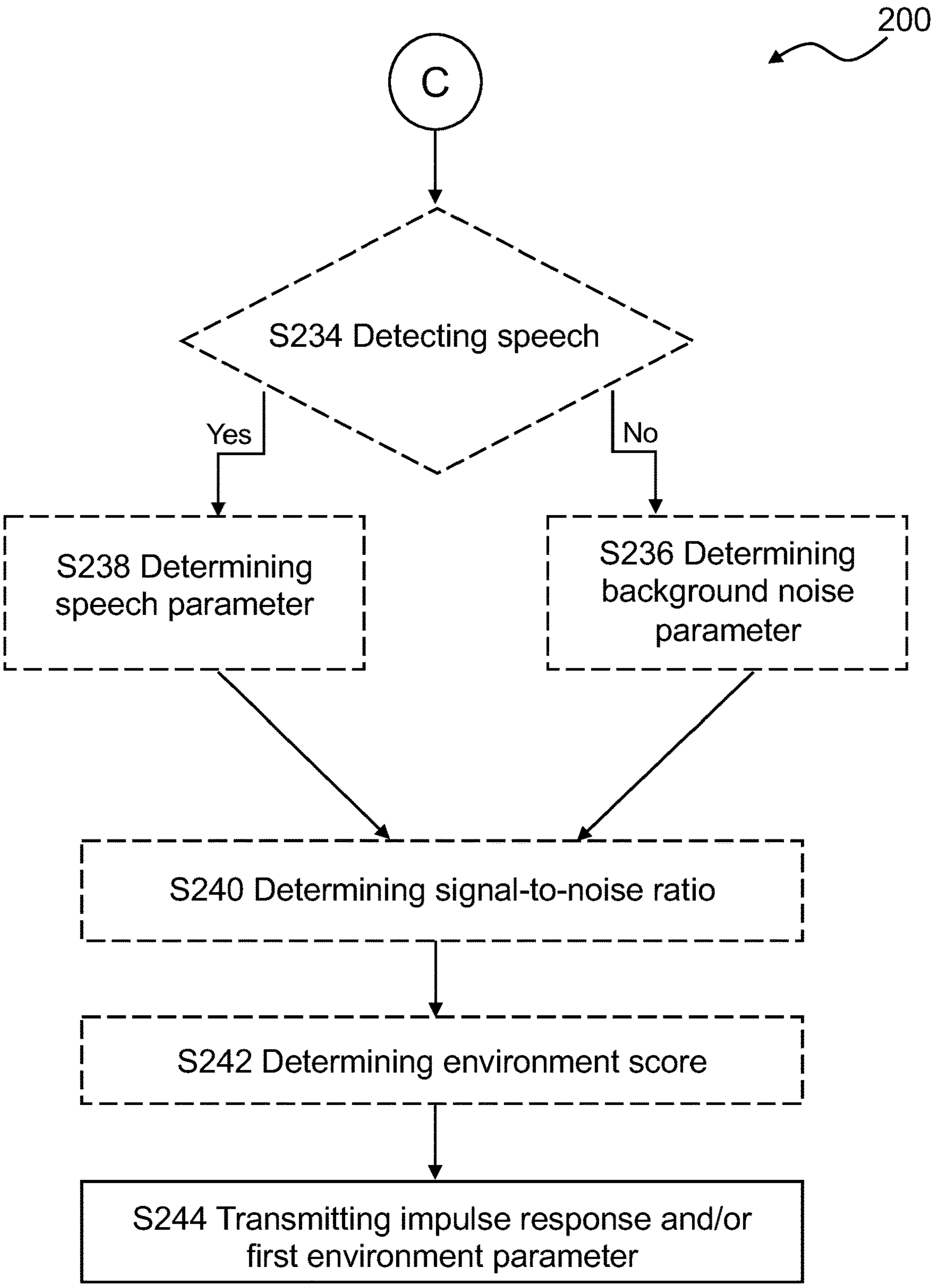

FIG. 2 schematically illustrates a speakerphone, such as a speakerphone 10 according to the present disclosure (such as the speakerphone 10 disclosed in FIG. 1). The speakerphone 10 comprises a processor 100, a speaker 10D, and a first microphone 10E. In one or more example speakerphones, the processor 10C comprises a far-end processor 78 configured to obtain a far-end signal 51, such as an audio signal, from a far-end. The far-end processor 78 may be configured to obtain and/or to process audio signals from the far-end. The far-end processor 78 may be configured to obtain and/or to process the far-end signal 51 for provision of an internal output signal 52, e.g., to the speaker 10D and/or to the impulse response determiner 70A.

The far-end processor 78 may be configured to obtain and/or to process the microphone input signal 50 for provision of an external output signal 53, e.g., to the far-end. The far-end processor 78 may be configured to output the internal output signal 52 to the speaker 10D for provision of an internal audio output signal 55. The speakerphone 10 is configured to output, using the speaker 10D and based on the internal output signal, the internal audio output signal 55 in the environment.

The speakerphone 10 is configured to determine, using the processor 10C and based on an internal output signal 52 and a microphone input signal 50, an impulse response 54 associated with the environment. In one or more example speakerphones, the speakerphone 10, such as the processor 10C, comprises an impulse response determiner 70A, such as an impulse response determination module, configured to determine an impulse response 54, based on the internal output signal 52 and the microphone input signal 50. The impulse response determiner 70A may be configured to obtain the internal output signal 52 from the far-end processor 78.

In one or more example speakerphones, the processor 10C comprises machine learning circuitry 74 configured to operate according to a machine learning model. In one or more example speakerphones, to determine the one or more environment parameters comprises to determine one or more environment parameters 62, based on the impulse response 54, using the machine learning circuitry 74.

The speakerphone 10 is configured to determine, such as using the processor 10C and based on the impulse response 54, one or more environment parameters 56 indicative of acoustics of the environment. In one or more example speakerphones, the speakerphone 10, such as the processor 100, comprises a feature extractor 72, such as a feature extractor module, configured to determine one or more environment parameters 56 based on the impulse response 54. In one or more example speakerphones, the feature extractor 72 is configured to output 61 the one or more environment parameters 56 to the machine learning circuitry 74. In one or more example speakerphones, the machine learning circuitry 74 is configured to determine the one or more environment parameters 62 based on the one or more environment parameters 56. In one or more example speakerphones, the machine learning circuitry 74 is configured to output 64 the one or more environment parameters 62, e.g., output to a server device and/or to a memory of the speakerphone 10.

The speakerphone 10 is configured to determine, such as using the processor 10C and based on the one or more environment parameters 56, an environment score 66 indicative of a suitability of a conference setup in the environment. In one or more example speakerphones, the speakerphone 10, such as the processor 10C, comprises an environment score determiner 76, such as an environment score determination module, configured to determine an environment score 66, based on the one or more environment parameters 56, 62. In one or more example speakerphones, the environment score determiner 76 is configured to output the environment score 66 to the far-end processor 78. The far-end processor 78 may be configured to process the microphone input signal 50 based on the environment score 66.

In one or more example speakerphones, the speakerphone 10 is configured to determine, based on the impulse response 54, one or more of: a first parameter indicative of a first reflection characteristic, a second parameter indicative of a second reflection characteristic, and a third parameter indicative of a third reflection characteristic. In one or more example speakerphones, the speakerphone 10 is configured to determine, based on the impulse response 54, and using the feature extractor 72 and/or the machine learning circuitry 74, one or more of: a first parameter indicative of a first reflection characteristic, a second parameter indicative of a second reflection characteristic, and a third parameter indicative of a third reflection characteristic. In one or more example speakerphones, the first environment parameter 56 is based on one or more of: the first parameter, the second parameter, and the third parameter. In other words, the speakerphone 10 may be configured to determine, such as using the environment score determiner 76, the environment score 66 based on one or more of: the first parameter, the second parameter, and the third parameter. In one or more example speakerphones, the first environment parameter 56 comprises one or more of the first parameter, the second parameter, and the third parameter. In one or more example speakerphones, the feature extractor 72 is configured to output 61 one or more of the first parameter, the second parameter, and the third parameter, to the machine learning circuitry 74. In one or more example speakerphones, the machine learning circuitry 74 is configured to determine the one or more environment parameters 62 based on one or more of the first parameter, the second parameter, and the third parameter.

In one or more example speakerphones, the first parameter is a reverberation time (RT), the second parameter is a direct-to-reverberant ratio (DRR), and/or the third parameter is an early decay time (EDT). In one or more example speakerphones, the environment score 66 may be determined, using the environment score determiner 76, based on one or more of: the reverberation time, the direct-to-reverberant time, and the early decay time.

In one or more example speakerphones, the first environment parameter 56 is indicative of a size of the environment, a volume of the environment, a level of absorption of the environment, or a position of the speakerphone 10 in the environment. In other words, the speakerphone 10 may be configured to determine, such as using the processor 10C and based on the impulse response 54, one or more of a size of the environment, a volume of the environment, a level of absorption of the environment, and/or a position of the speakerphone in the environment. For example, the speakerphone 10 may be configured to determine, such as using the feature extractor 72 and/or the machine learning circuitry 74, and based on the impulse response 54, one or more of a size of the environment, a volume of the environment, a level of absorption of the environment, and/or a position of the speakerphone 10 in the environment.

In one or more example speakerphones, the processor 100 comprises an echo canceller 70, such as an echo canceller module. The impulse response determiner 70A may be part of the echo canceller 70. In one or more example speakerphones, to determine the impulse response 54, comprises to reduce, using the echo canceller 70, one or more echo components from the microphone input signal 50.

In one or more example speakerphones, the speakerphone 10 is configured to determine, using the echo canceller 70 and based on the internal output signal 52 and the microphone input signal 50, the impulse response 54. In one or more example speakerphones, the echo canceller 70 comprises one or both of a linear echo canceller and a residual echo suppressor (both not shown).

In one or more example speakerphones, the processor 10C comprises a speech detector module (not shown) configured to detect speech based on the microphone input signal 50. The speech detector module may be comprised in the impulse response determiner 70A. In one or more example speakerphones, the speakerphone 10 is configured to, in accordance with a detection of no speech in the microphone input signal 50 and a detection of no internal output signal 52, determine, such as using the impulse response determiner 70A, a background noise parameter. In one or more example speakerphones, the speakerphone 10 is configured to, in accordance with a detection of speech in the microphone input signal 50 and a detection of no internal output signal 52, determine, such as using the impulse response determiner 70A, a speech parameter. In one or more example speakerphones, the speakerphone 10 is configured to determine, such as using the impulse response determiner 70A and based on the background noise parameter and the speech parameter, a signal-to-noise ratio.

In one or more example speakerphones, the speakerphone 10 is configured to determine, such as using the environment score determiner 76 and based on the first environment parameter 56 and the signal-to-noise ratio, the environment score 66.

The speakerphone 10 may be configured to perform any of the methods disclosed in FIGS. 3A-3D and FIGS. 4A-4D.

The processor 100 is optionally configured to perform any of the operations disclosed in FIG. 3A-3D (such as any one or more of S102A, S102B, S108A, S108B, S110, S112A, S114, S116A, S118, S120, S124, S126, S128, S130, S132, S133, S134, S136, S138).

The processor 100 is optionally configured to perform any of the operations disclosed in FIG. 4A-4D (such as any one or more of S202A, S202B, S208A, S208B, S210, S212A, S214, S216, S218, S220, S222, S224, S226, S228, S230, S232, S233, S234, S236, S238, S240, S242). The operations of the speakerphone 10 may be embodied in the form of executable logic routines (for example, lines of code, software programs, etc.) that are stored on a non-transitory computer readable medium (for example, memory 10A) and are executed by the processor 10C).

Furthermore, the operations of the speakerphone 10 may be considered a method that the speakerphone 10 is configured to carry out. Also, while the described functions and operations may be implemented in software, such functionality may as well be carried out via dedicated hardware or firmware, or some combination of hardware, firmware and/or software.

Memory 10A may be one or more of a buffer, a flash memory, a hard drive, a removable media, a volatile memory, a non-volatile memory, a random access memory (RAM), or other suitable device. In a typical arrangement, memory 10A may include a non-volatile memory for long term data storage and a volatile memory that functions as system memory for the processor 10C. The memory 10A may exchange data with the processor 10C over a data bus. Control lines and an address bus between the memory 10B and the processor 10C also may be present (not shown in FIG. 1). The memory 10A is considered a non-transitory computer readable medium.

The memory 10A may be configured to store information such as impulse response(s), environment parameter(s), environment score(s), parameter(s), such as first parameter (s), second parameter(s), and/or third parameter(s), conference setup recommendation(s), test signal(s), and/or machine learning model(s) as disclosed herein in a part of the memory.

Figure 5:
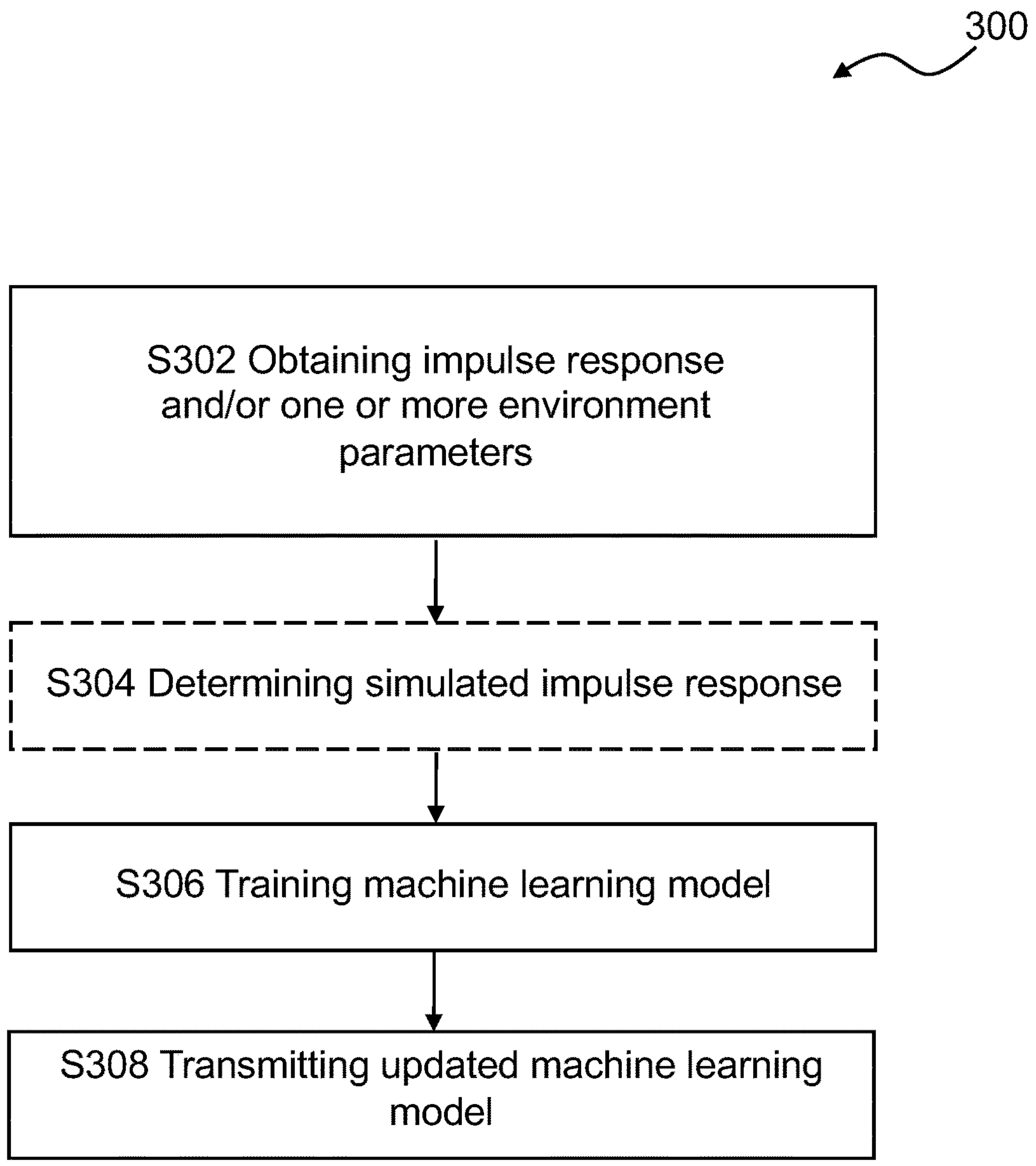
FIG. 5 is a flow chart of an example method according to the present disclosure.

The processor 20C is optionally configured to perform any of the operations disclosed in FIG. 5 (such as S304). The operations of the server device 20 may be embodied in the form of executable logic routines (for example, lines of code, software programs, etc.) that are stored on a non-transitory computer readable medium (for example, memory 20A) and are executed by the processor 20C).

Furthermore, the operations of the server device 20 may be considered a method that the speakerphone 10 is configured to carry out and vice-versa. Also, while the described functions and operations may be implemented in software, such functionality may as well be carried out via dedicated hardware or firmware, or some combination of hardware, firmware and/or software.

Memory 20A may be one or more of a buffer, a flash memory, a hard drive, a removable media, a volatile memory, a non-volatile memory, a random access memory (RAM), or other suitable device. In a typical arrangement, memory 20A may include a non-volatile memory for long term data storage and a volatile memory that functions as system memory for the processor 20C. The memory 20A may exchange data with the processor 20C over a data bus. Control lines and an address bus between the memory 20B and the processor 20C also may be present (not shown in FIG. 1). The memory 20A is considered a non-transitory computer readable medium.

The memory 20A may be configured to store information such as impulse response(s), environment parameter(s), environment score(s), parameter(s), such as first parameter(s), second parameter(s), and/or third parameter(s), conference setup recommendation(s), test signal(s), and/or machine learning model(s) as disclosed herein in a part of the memory.

The system 2 may be configured to perform any of the methods disclosed in FIGS. 3A-3D, FIGS. 4A-4D, and FIG. 5.

Furthermore, the operations of the system 2 may be considered a method that the system 2 is configured to carry out. Also, while the described functions and operations may be implemented in software, such functionality may as well be carried out via dedicated hardware or firmware, or some combination of hardware, firmware and/or software.

FIGS. 3A-3D show a flow diagram of an example method, such as a method 100. A method 100 of operating a speakerphone system is disclosed. The speakerphone system comprises one or more speakerphones including a first speakerphone. The speakerphone system comprises an electronic device. The method 100 comprises obtaining S102, using the first speakerphone, an internal output signal for provision of an internal audio output signal in an environment. The method 100 comprises outputting S104, using the first speakerphone and based on the internal output signal, an internal audio output signal in the environment. The method 100 comprises obtaining S106, using the first speakerphone, a microphone input signal. The method 100 comprises determining S112, using the first speakerphone and based on the internal output signal and the microphone input signal, an impulse response associated with the environment. The method 100 comprises determining S116, using the first speakerphone and based on the impulse response, one or more environment parameters indicative of acoustics of the environment, the one or more environment parameters including a first environment parameter. The method 100 comprises determining S122, based on the first environment parameter, an environment score indicative of suitability of a conference setup in the environment. The method 100 comprises outputting S140, using the first speakerphone, the environment score.

In one or more example methods, determining S116 the one or more environment parameters comprises determining S116A the one or more environment parameters, based on the impulse response, using a machine learning model. In one or more example methods, the speakerphone comprising a processor comprises machine learning circuitry configured to operate according to a machine learning model.

In one or more example methods, the method 100 comprises determining S114, based on the impulse response, one or more of: a first parameter indicative of a first reflection characteristic, a second parameter indicative of a second reflection characteristic, and a third parameter indicative of a third reflection characteristic; In one or more example methods, the first environment parameter is based on one or more of: the first parameter, the second parameter, and the third parameter.

In one or more example methods, the first parameter is a reverberation time, the second parameter is a direct-to-reverberant ratio, and/or the third parameter is an early decay time.

In one or more example methods, the first environment parameter is indicative of a size of the environment, a volume of the environment, a level of absorption of the environment, or a position of the speakerphone in the environment.

In one or more example methods, the method 100 comprises processing S108, the microphone input signal for provision of an external output signal. In one or more example methods, the method comprises controlling S108A the processing of the microphone input signal based on the first environment parameter. In one or more example methods, the method comprises transmitting S110, the external output signal.

In one or more example methods, the method 100 comprises determining S124, based on the first environment parameter, a conference setup recommendation. In one or more example methods, the method 100 comprises outputting S126, the conference setup recommendation.

In one or more example methods, determining S112 the impulse response comprises reducing S112A, one or more echo components from the microphone input signal.

In one or more example methods, obtaining S102 the internal output signal comprises obtaining S102A, a test signal. In one or more example methods, the internal output signal is based on the test signal.

In one or more example methods, the method 100 comprises determining S108B, the impulse response based on the test signal.

In one or more example methods, the method 100 comprises determining S118, a background noise parameter. In one or more example methods, the method comprises determining S120, based on the first environment parameter and the background noise parameter, the environment score.

In one or more example methods, obtaining S102 the internal output signal comprises obtaining S102B a far-end input signal from a far-end communication device. In one or more example methods, the internal output signal is based on the far-end input signal.

In one or more example methods, the method 100 comprises detecting S128 whether an internal output signal is present. In one or more example methods, the method 100 comprises, in accordance with a detection S128 of an internal output signal, outputting S133 an internal audio output signal based on the internal output signal.

In one or more example methods, the method 100 comprises detecting S130, based on the microphone input signal, whether the microphone input signal comprises speech.

In one or more example methods, the method 100 comprises, in accordance with a detection S130 of no speech and a detection S128 of no internal output signal, determining S132 a background noise parameter. In one or more example methods, the method 100 comprises, in accordance with a detection S130 of speech and detection S128 of no internal output signal, determining S134 a speech parameter. In one or more example methods, the method 100 comprises determining S136, based on the background noise parameter and the speech parameter, a signal-to-noise ratio. In one or more example methods, the method 100 comprises determining S138, based on the first environment parameter and the signal-to-noise ratio, the environment score.

FIGS. 4A-4D show a flow diagram of an example method, such as a method 200. A method 200 of operating a speakerphone system is disclosed. The speakerphone system comprises one or more speakerphones including a first speakerphone. The speakerphone system comprises a server device. The method 200 comprises obtaining S202, using the first speakerphone, an internal output signal for provision of an internal audio output signal in an environment. The method 200 comprises outputting S204, using the first speakerphone and based on the internal output signal, an internal audio output signal in the environment. The method 200 comprises obtaining S206, using the first speakerphone, a microphone input signal. The method 200 comprises determining S208, using the first speakerphone and based on the internal output signal and the microphone input signal, an impulse response associated with the environment. The method 200 comprises determining S212, using the first speakerphone and based on the impulse response, one or more environment parameters indicative of acoustics of the environment, the one or more environment parameters including a first environment parameter. The method 200 comprises transmitting S244, from the first speakerphone, the impulse response and/or the first environment parameter to the server device.

In one or more example methods, the method comprises obtaining S214 an environment configuration associated with the environment. In one or more example methods, the method 200 comprises transmitting S216 the environment configuration to the server device.

In one or more example methods, the method 200 comprises obtaining S218 a user input indicative of one or more properties of the environment. In one or more example methods, the environment configuration is based on the user input.

In one or more example methods, determining S212 the one or more environment parameters comprises determining S212A the one or more environment parameters, based on the impulse response, using a machine learning model.

In one or more example methods, the method 200 comprises determining S210, based on the impulse response, one or more of: a first parameter indicative of a first reflection characteristic, a second parameter indicative of a second reflection characteristic, and a third parameter indicative of a third reflection characteristic. In one or more example methods, the first environment parameter is based on one or more of: the first parameter, the second parameter, and the third parameter. In one or more example methods the speakerphone is configured to transmit, via the interface, one or more of the first parameter, the second parameter, and the third parameter.

In one or more example methods, the first parameter is a reverberation time, the second parameter is a direct-to-reverberant ratio, and/or the third parameter is an early decay time.

In one or more example methods, the first environment parameter is indicative of a size of the environment, a volume of the environment, a level of absorption of the environment, or a position of the speakerphone in the environment.

In one or more example methods, the method 200 comprises determining S220, based on the first environment parameter, an environment score indicative of suitability of a conference setup in the environment. In one or more example methods, the method 200 comprises transmitting S222 the environment score to the server device.

In one or more example methods, the method comprises determining S228, based on the first environment parameter, a conference setup recommendation. In one or more example methods, the method 200 comprises transmitting S230 the conference setup recommendation to the server device.

In one or more example methods, determining S208 the impulse response comprises reducing S208A one or more echo components from the microphone input signal.

In one or more example methods, obtaining S202 the internal output signal comprises obtaining S202A a test signal. In one or more example methods, the internal output signal is based on the test signal.

In one or more example methods, the method 200 comprises determining S208B the impulse response based on the test signal.

In one or more example methods, the method 200 comprises determining S224 a background noise parameter. In one or more example methods, the method comprises determining S226, based on the first environmental parameter and the background noise parameter, the environment score.

In one or more example methods, obtaining S202 the internal output signal comprises obtaining S202B a far-end input signal from a far-end communication device. In one or more example methods, the internal output signal is based on the far-end input signal.

In one or more example methods, the method 200 comprises detecting S232 whether an internal output signal is present. In one or more example methods, the method 200 comprises, in accordance with a detection S232 of an internal output signal, outputting S233 an internal audio output signal based on the internal output signal.

In one or more example methods, the method 200 comprises detecting S234, based on the microphone input signal, whether the microphone input signal comprises speech.

In one or more example methods, the method 200 comprises, in accordance with a detection S234 of no speech and a detection S232 of no internal output signal, determining S236 a background noise parameter. In one or more example methods, the method comprises, in accordance with a detection S234 of speech and detection S232 of no internal output signal, determining S238 a speech parameter. In one or more example methods, the method comprises determining S240, based on the background noise parameter and the speech parameter, a signal-to-noise ratio. In one or more example methods, the method comprises determining S242, based on the first environment parameter and the signal-to-noise ratio, the environment score.

FIG. 5 show a flow diagram of an example method, such as a method 300. A method 300 of operating a speakerphone system is disclosed. The speakerphone system comprises one or more speakerphones including a first speakerphone.

The speakerphone system comprises a server device. The method 300 comprises obtaining S302, from a speakerphone, an impulse response associated with an environment and/or one or more environment parameters indicative of acoustics of the environment. The method 300 comprises training S306 the machine learning model based on the impulse response and/or the environment parameters for provision of an updated machine learning model. The method 300 comprises transmitting S308 the updated machine learning model to a speakerphone.

In one or more example methods, the method comprises determining S304 based on the impulse response and/or the one or more environment parameters, a simulated impulse response associated with a simulated environment. In one or more example methods, the method comprises training S306 the machine learning model based on the simulated impulse response for provision of an updated machine learning model. In one or more example methods, the method comprises transmitting S308 the updated machine learning model to a speakerphone.

In one or more example methods, the updated machine learning model is an environment parameter detection model. In one or more example methods, the method comprises transmitting S308 the updated machine learning model to a speakerphone.

In one or more example methods, the updated machine learning model is an echo canceller model. In one or more example methods, the method comprises transmitting S308 the updated machine learning model to a speakerphone.

Figure 6:
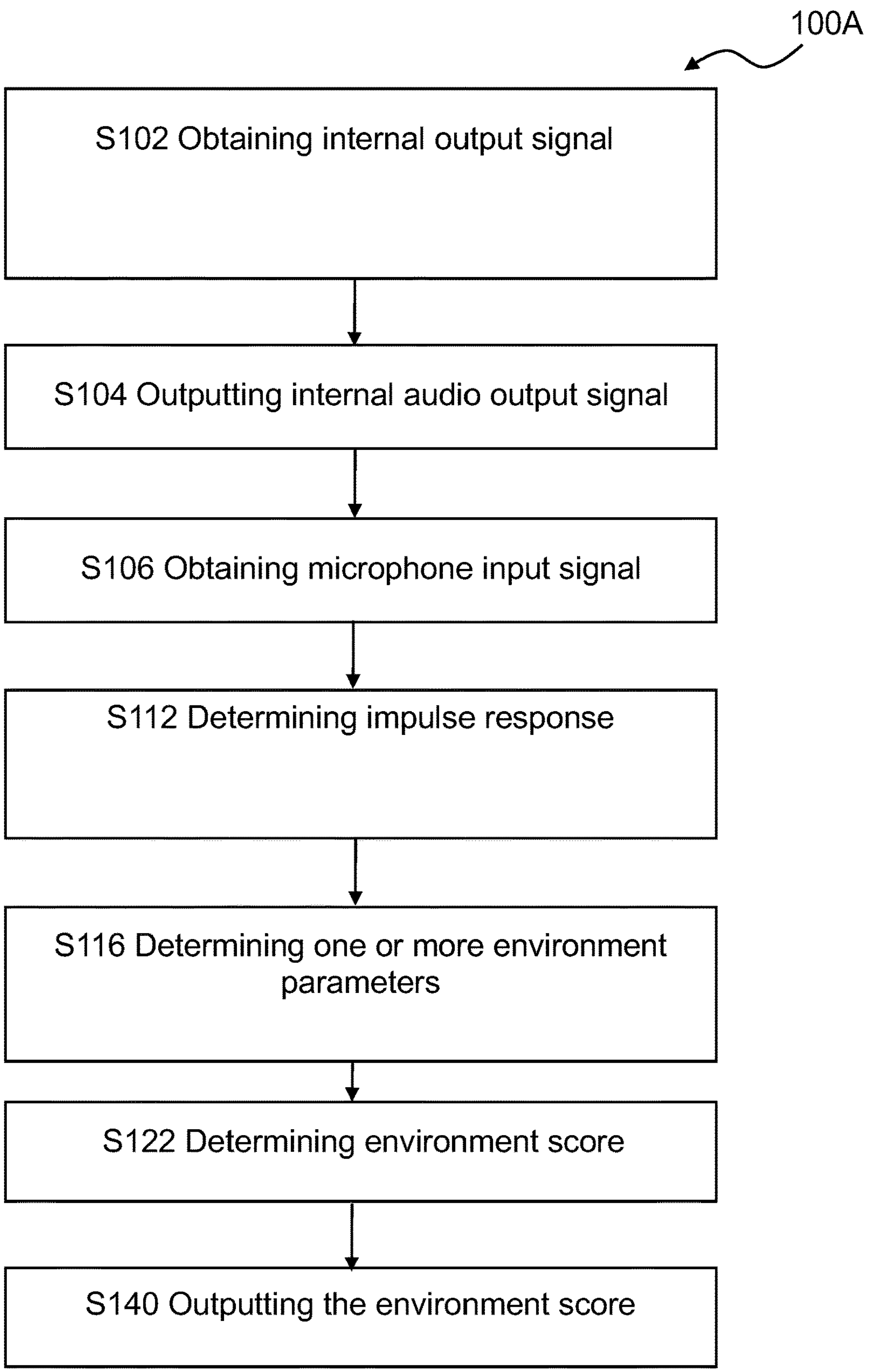
FIG. 6 is a flow chart of an example method according to the present disclosure.

FIG. 6 shows a flow diagram of an example method, such as a method 100A. A method 100A of operating a speakerphone system is disclosed. The speakerphone system comprises one or more speakerphones including a first speakerphone. The speakerphone system comprises an electronic device. The method 100A comprises obtaining S102, using the first speakerphone, an internal output signal for provision of an internal audio output signal in an environment. The method 100A comprises outputting S104, using the first speakerphone and based on the internal output signal, an internal audio output signal in the environment. The method 100A comprises obtaining S106, using the first speakerphone, a microphone input signal. The method 100A comprises determining S112, using the first speakerphone and based on the internal output signal and the microphone input signal, an impulse response associated with the environment. The method 100A comprises determining S116, using the first speakerphone and based on the impulse response, one or more environment parameters indicative of acoustics of the environment, the one or more environment parameters including a first environment parameter. The method 100A comprises determining S122, based on the first environment parameter, an environment score indicative of suitability of a conference setup in the environment. The method 100A comprises outputting S140, using the first speakerphone, the environment score.

Figure 7:
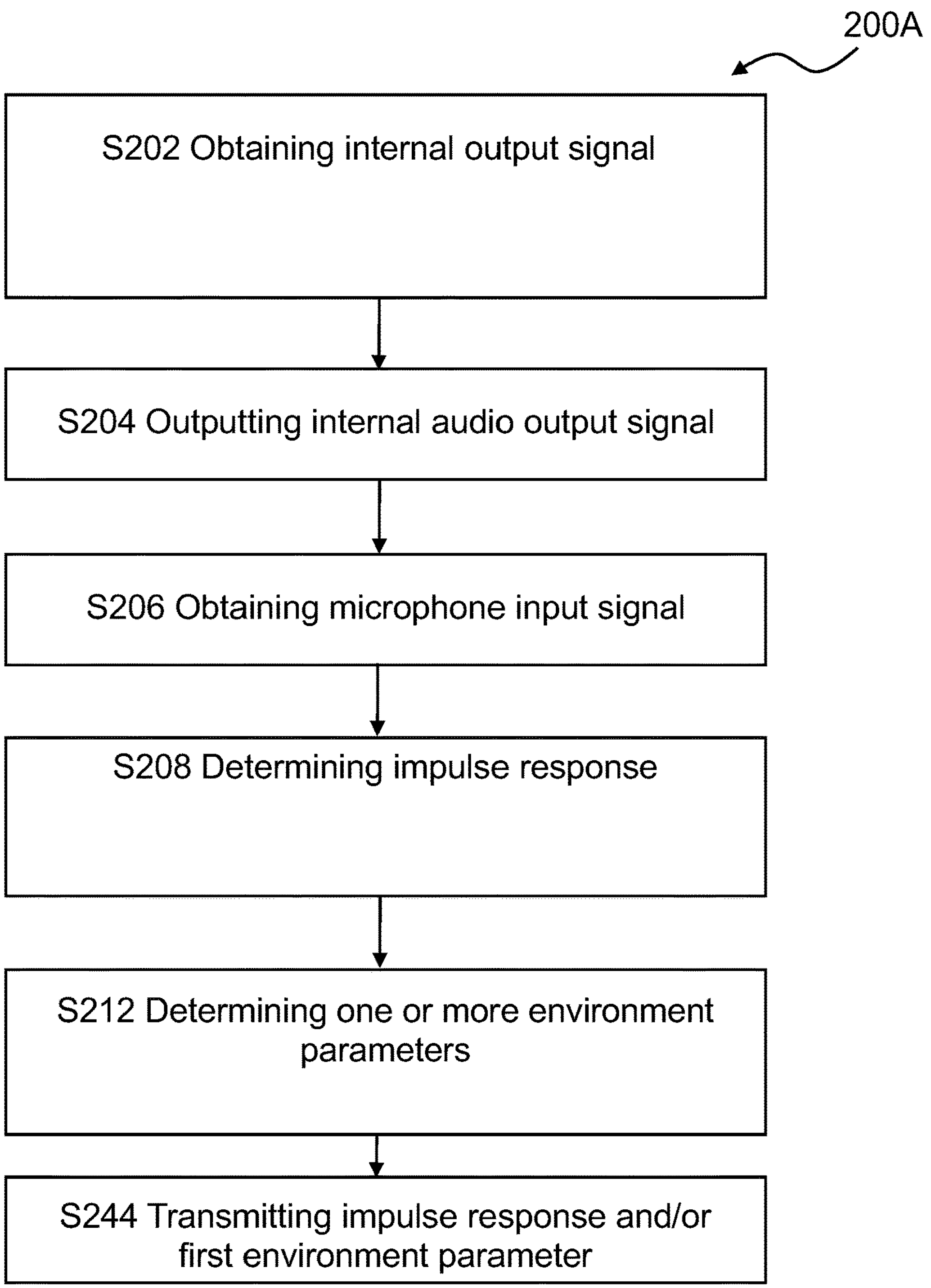
FIG. 7 is a flow chart of an example method according to the present disclosure.

FIG. 7 shows a flow diagram of an example method, such as a method 200A. A method 200A of operating a speakerphone system is disclosed. The speakerphone system comprises one or more speakerphones including a first speakerphone. The speakerphone system comprises a server device. The method 200A comprises obtaining S202, using the first speakerphone, an internal output signal for provision of an internal audio output signal in an environment. The method 200A comprises outputting S204, using the first speakerphone and based on the internal output signal, an internal audio output signal in the environment. The method 200A comprises obtaining S206, using the first speakerphone, a microphone input signal. The method 200A comprises determining S208, using the first speakerphone and based on the internal output signal and the microphone input signal, an impulse response associated with the environment. The method 200A comprises determining S212, using the first speakerphone and based on the impulse response, one or more environment parameters indicative of acoustics of the environment, the one or more environment parameters including a first environment parameter. The method 200A comprises transmitting S244, from the first speakerphone, the impulse response and/or the first environment parameter to the server device.

Examples of speakerphones, systems, and methods according to the disclosure are set out in the following items:

Item 1. A speakerphone, the speakerphone comprising an interface, a speaker, and one or more microphones including a first microphone, the speakerphone comprising a processor and a memory, wherein the speakerphone is configured to:
- obtain, using the processor, an internal output signal for provision of an internal audio output signal in an environment;
- output, using the speaker and based on the internal output signal, the internal audio output signal in the environment;
- obtain, using the first microphone, a microphone input signal;
- determine, using the processor and based on the internal output signal and the microphone input signal, an impulse response associated with the environment;
- determine, using the processor and based on the impulse response, one or more environment parameters indicative of acoustics of the environment, the one or more environment parameters including a first environment parameter;
- determine, based on the first environment parameter, an environment score indicative of suitability of a conference setup in the environment; and
- output the environment score.

Item 2. Speakerphone according to item 1, wherein the processor comprises machine learning circuitry configured to operate according to a machine learning model, wherein to determine the one or more environment parameters comprises to determine the one or more environment parameters, based on the impulse response, using the machine learning model.

Item 3. Speakerphone according to any of the previous items, wherein the speakerphone is configured to determine, based on the impulse response, one or more of: a first parameter indicative of a first reflection characteristic, a second parameter indicative of a second reflection characteristic, and a third parameter indicative of a third reflection characteristic; and wherein the first environment parameter is based on one or more of: the first parameter, the second parameter, and the third parameter.

Item 4. Speakerphone according to items 3, wherein the first parameter is a reverberation time, the second parameter is a direct-to-reverberant ratio, and/or the third parameter is an early decay time.

Item 5. Speakerphone according to any of the previous items, wherein the first environment parameter is indicative of a size of the environment, a volume of the environment, a level of absorption of the environment, or a position of the speakerphone in the environment.

Item 6. Speakerphone according to any of the previous items, wherein the speakerphone is configured to:

process, using the processor, the microphone input signal for provision of an external output signal;

control the processing of the microphone input signal based on the first environment parameter; and transmit, via the interface, the external output signal.

Item 7. Speakerphone according to any of the previous items, wherein the speakerphone is configured to determine, based on the first environment parameter, a conference setup recommendation; and wherein the speakerphone is configured to output, via the interface and/or the speaker, the conference setup recommendation.

Item 8. Speakerphone according to any of the previous items, wherein the processor comprises an echo canceller; and wherein to determine the impulse response comprises to reduce, using the echo canceller, one or more echo components from the microphone input signal.

Item 9. Speakerphone according to item 8, wherein the echo canceller comprises one or both of a linear echo canceller and a residual echo suppressor.

Item 10. Speakerphone according to any of the previous items, wherein to obtain the internal output signal comprises to obtain a test signal; and wherein the internal output signal is based on the test signal.

Item 11. Speakerphone according to item 10, wherein the speakerphone is configured to determine the impulse response based on the test signal.

Item 12. Speakerphone according to any of the previous items, wherein the speakerphone is configured to determine a background noise parameter, and wherein the speakerphone is configured to determine, based on the first environment parameter and the background noise parameter, the environment score.

Item 13. Speakerphone according to any of the previous items, wherein to obtain the internal output signal comprises to obtain a far-end input signal from a far-end communication device; and wherein the internal output signal is based on the far-end input signal.

Item 14. Speakerphone according to any of the previous items, wherein the processor comprises a speech detector module configured to detect speech based on the microphone input signal.

Item 15. Speakerphone according to item 14, wherein the speakerphone is configured to, in accordance with a detection of no speech and a detection of no internal output signal, determine a background noise parameter, and in accordance with a detection of speech and a detection of no internal output signal, determine a speech parameter, wherein the speakerphone is configured to determine a signal-to-noise ratio based on the background noise parameter and the speech parameter, and wherein the speakerphone is configured to determine, based on the first environment parameter and the signal-to-noise ratio, the environment score.

Item 16. A system comprising a speakerphone according to any of items 1 to 15 and an electronic device.

Item 17. A method of operating a speakerphone system comprising one or more speakerphones including a first speakerphone and an electronic device, wherein the method comprises:

obtaining (S102), using the first speakerphone, an internal output signal for provision of an internal audio output signal in an environment;

outputting (S104), using the first speakerphone and based on the internal output signal, an internal audio output signal in the environment;

obtaining (S106), using the first speakerphone, a microphone input signal;

determining (S112), using the first speakerphone and based on the internal output signal and the microphone input signal, an impulse response associated with the environment;

determining (S116), using the first speakerphone and based on the impulse response, one or more environment parameters indicative of acoustics of the environment, the one or more environment parameters including a first environment parameter;

determining (S122), based on the first environment parameter, an environment score indicative of suitability of a conference setup in the environment; and outputting (S140), using the first speakerphone, the environment score.

Item 18. The method according to item 17, wherein determining (S116) the one or more environment parameters comprises:

determining (S116A) the one or more environment parameters, based on the impulse response, using a machine learning model.

Item 19. The method according to any of items 17-18, wherein the method comprises:

determining (S114), based on the impulse response, one or more of: a first parameter indicative of a first reflection characteristic, a second parameter indicative of a second reflection characteristic, and a third parameter indicative of a third reflection characteristic;

and wherein the first environment parameter is based on one or more of: the first parameter, the second parameter, and the third parameter.

Item 20. The method according to item 19, wherein the first parameter is a reverberation time, the second parameter is a direct-to-reverberant ratio, and/or the third parameter is an early decay time.

Item 21. The method according to any of items 17-20, wherein the first environment parameter is indicative of a size of the environment, a volume of the environment, a level of absorption of the environment, or a position of the speakerphone in the environment.

Item 22. The method according to any of items 17-21, wherein the method comprises:

processing (S108), the microphone input signal for provision of an external output signal;

controlling (S108A) the processing of the microphone input signal based on the first environment parameter; and transmitting (S110), the external output signal.

Item 23. The method according to any of items 17-22, wherein the method comprises:

determining (S124), based on the first environment parameter, a conference setup recommendation;

outputting (S126), the conference setup recommendation.

Item 24. The method according to any of items 17-23, wherein determining (S112) the impulse response comprises:

reducing (S112A) one or more echo components from the microphone input signal.

Item 25. The method according to any of items 17-24, wherein obtaining (S102) the internal output signal comprises:

obtaining (S102A), a test signal;

and wherein the internal output signal is based on the test signal.

Item 26. The method according to item 25, wherein the method comprises:
determining (S108B), the impulse response based on the test signal.

Item 27. The method according to any of items 17-26, wherein the method comprises:
determining (S118), a background noise parameter; and
determining (S120), based on the first environment parameter and the background noise parameter, the environment score.

Item 28. The method according to any of items 17-27, wherein obtaining (S102) the internal output signal comprises:
obtaining (S102B) a far-end input signal from a far-end communication device; and wherein the internal output signal is based on the far-end input signal.

Item 29. The method according to any of items 17-28, wherein the method comprises:
detecting (S130) speech based on the microphone input signal.

Item 30. The method according to item 29, wherein the method comprises:
in accordance with a detection (S130) of no speech and a detection (S128) of no internal output signal, determining (S132) a background noise parameter;
in accordance with a detection (S130) of speech and detection (S128) of no internal output signal, determining (S134) a speech parameter;
determining (S136), based on the background noise parameter and the speech parameter, a signal-to-noise ratio; and
determining (S138), based on the first environment parameter and the signal-to-noise ratio, the environment score.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the Figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

LIST OF REFERENCES

1A user(s), near-end
1B user(s), speaker(s), far-end
2 speakerphone system
4 user input, obtain
6 output
10 speakerphone
10A memory
10B one or more interfaces
10C processor
10D one or more speakers
10E first microphone

13 transmit
14 obtain
16 obtain, receive
18 transmit
20 server device
20A memory
20B one or more interfaces
20C one or more processors
21 machine learning circuitry
22 transmit
24 obtain, receive
30 communication device
36 output
38 obtain
40 network
50 microphone input signal
51 far-end signal
52 internal output signal
53 external output signal
54 impulse response
55 internal audio output signal
56 first environment parameter
60 electronic device
61 output
62 environment parameter(s)
64 output
66 environment score
70 echo canceller
70A impulse response determiner
72 feature extractor
74 machine learning circuitry
76 environment score determiner
78 far-end processor
S102 obtaining internal output signal
S104 outputting internal audio output signal
S106 obtaining microphone input signal
S112 determining impulse response
S116 determining one or more environment parameters
S122 determining environment score
S140 outputting the environment score
S202 obtaining internal output signal
S204 outputting internal audio output signal
S206 obtaining microphone input signal
S208 determining impulse response
S212 determining one or more environment parameter
S244 transmitting impulse response and/or first environment parameter
S302 obtaining impulse response and/or one or more environment parameters

The invention claimed is:

1. A speakerphone, the speakerphone comprising an interface, a speaker, and one or more microphones including a first microphone, the speakerphone comprising a processor and a memory, wherein the speakerphone is configured to:

obtain, using the processor, an internal output signal for provision of an internal audio output signal in an environment;

output, using the speaker and based on the internal output signal, the internal audio output signal in the environment;

obtain, using the first microphone, a microphone input signal, wherein the microphone input signal is the resulting signal after the internal audio output signal is outputted by the speaker in the environment;

determine, using the processor and based on the internal output signal and the microphone input signal, an impulse response associated with the environment;

determine, based on the impulse response, one or more of: a first parameter indicative of a first reflection characteristic, a second parameter indicative of a second reflection characteristic, and a third parameter indicative of a third reflection characteristic;

determine, using the processor and based on the impulse response, one or more environment parameters indicative of acoustics of the environment, the one or more environment parameters including a first environment parameter; wherein the first environment parameter is based on one or more of: the first parameter, the second parameter, and the third parameter;

determine, based on the first environment parameter, an environment score indicative of suitability of a conference setup in the environment; and output the environment score.

2. The speakerphone according to claim 1, wherein the processor comprises machine learning circuitry configured to operate according to a machine learning model, wherein to determine the one or more environment parameters comprises to determine the one or more environment parameters, based on the impulse response, using the machine learning model.

3. The speakerphone according to claim 1, wherein one or more of: the first parameter is a reverberation time, the second parameter is a direct-to-reverberant ratio, or the third parameter is an early decay time.

4. The speakerphone according to claim 1, wherein the first environment parameter is indicative of a size of the environment, a volume of the environment, or a level of absorption of the environment.

5. The speakerphone according to claim 1, wherein the speakerphone is configured to:

process, using the processor, the microphone input signal for provision of an external output signal;

control the processing of the microphone input signal based on the first environment parameter; and transmit, via the interface, the external output signal.

6. The speakerphone according to claim 1, wherein the speakerphone is configured to determine, based on the first environment parameter, a conference setup recommendation; and wherein the speakerphone is configured to output, via the interface and/or the speaker, the conference setup recommendation.

7. The speakerphone according to claim 1, wherein the processor comprises an echo canceller; and wherein to determine the impulse response comprises to reduce, using the echo canceller, one or more echo components from the microphone input signal.

8. The speakerphone according to claim 7, wherein the echo canceller comprises one or both of a linear echo canceller and a residual echo suppressor.

9. The speakerphone according to claim 1, wherein to obtain the internal output signal comprises to obtain a test signal; and wherein the internal output signal is based on the test signal.

10. The speakerphone according to claim 9, wherein the speakerphone is configured to determine the impulse response based on the test signal.

11. The speakerphone according to claim 1, wherein the speakerphone is configured to determine a background noise parameter, and wherein the speakerphone is configured to determine, based on the first environment parameter and the background noise parameter, the environment score.

12. The speakerphone according to claim 1, wherein to obtain the internal output signal comprises to obtain a far-end input signal from a far-end communication device; and wherein the internal output signal is based on the far-end input signal.

13. The speakerphone according to claim 1, wherein the processor comprises a speech detector module configured to detect speech based on the microphone input signal.

14. The s Speakerphone according to claim 13, wherein the speakerphone is configured to, in accordance with a detection of no speech and a detection of no internal output signal, determine a background noise parameter, and in accordance with a detection of speech and a detection of no internal output signal, determine a speech parameter, wherein the speakerphone is configured to determine a signal-to-noise ratio based on the background noise parameter and the speech parameter, and wherein the speakerphone is configured to determine, based on the first environment parameter and the signal-to-noise ratio, the environment score.

15. A system comprising a speakerphone according to claim 1 and an electronic device.

16. A method of operating a speakerphone system comprising one or more speakerphones including a first speakerphone and an electronic device, wherein the method comprises:

obtaining, using the first speakerphone, an internal output signal for provision of an internal audio output signal in an environment;

outputting, using the first speakerphone and based on the internal output signal, an internal audio output signal in the environment;

obtaining, using the first speakerphone, a microphone input signal, wherein the microphone input signal is the resulting signal after the internal audio output signal is outputted by a speaker in the environment;

determining, using the first speakerphone and based on the internal output signal and the microphone input signal, an impulse response associated with the environment;

determining, based on the impulse response, one or more of: a first parameter indicative of a first reflection characteristic, a second parameter indicative of a second reflection characteristic, and a third parameter indicative of a third reflection characteristic;

determining, using the first speakerphone and based on the impulse response, one or more environment parameters indicative of acoustics of the environment, the one or more environment parameters including a first environment parameter; wherein the first environment parameter is based on one or more of: the first parameter, the second parameter, and the third parameter;

determining, based on the first environment parameter, an environment score indicative of suitability of a conference setup in the environment; and outputting, using the first speakerphone, the environment score.

17. The method according to claim 16, wherein determining the one or more environment parameters comprises:

determining the one or more environment parameters, based on the impulse response, using a machine learning model.

18. The method according to claim 16, wherein one or more of: the first parameter is a reverberation time, the second parameter is a direct-to-reverberant ratio, and the third parameter is an early decay time.

* * * * *